(12) United States Patent
Aimoto et al.

(10) Patent No.: US 7,397,765 B2
(45) Date of Patent: Jul. 8, 2008

(54) BANDWIDTH MONITORING DEVICE

(75) Inventors: Takeshi Aimoto, Sagamihara (JP);
Nobuhito Matsuyama, Hadano (JP);
Kazuo Sugai, Hadano (JP); Hiroki Yano, Hadano (JP); Yoshihiko Sakata, Hadano (JP); Shinichi Akahane, Hachioji (JP); Yuichi Ishikawa, Machida (JP)

(73) Assignee: Hitachi, Ltd., Tokyo (JP)

( * ) Notice: Subject to any disclaimer, the term of this patent is extended or adjusted under 35 U.S.C. 154(b) by 993 days.

(21) Appl. No.: 10/769,082

(22) Filed: Jan. 30, 2004

(65) Prior Publication Data
US 2004/0184444 A1    Sep. 23, 2004

(30) Foreign Application Priority Data
Feb. 21, 2003    (JP) ............................. 2003-043863

(51) Int. Cl.
*H04L 1/00*    (2006.01)
(52) U.S. Cl. .................................. 370/252; 370/395.41
(58) Field of Classification Search ................. 370/229, 370/230, 232, 235, 235.1, 238, 252, 253, 370/395.21, 395.41, 412, 378, 363, 299
See application file for complete search history.

(56) References Cited

U.S. PATENT DOCUMENTS

| | | | |
|---|---|---|---|
| 5,007,043 A | | 4/1991 | Van Den Dool et al. |
| 6,252,848 B1* | | 6/2001 | Skirmont .................... 370/229 |
| 6,646,988 B1* | | 11/2003 | Nandy et al. ................. 370/235 |
| 6,901,593 B2* | | 5/2005 | Aweya et al. ................ 719/104 |
| 7,139,281 B1* | | 11/2006 | Bodin .......................... 370/412 |

FOREIGN PATENT DOCUMENTS

| | | |
|---|---|---|
| JP | 2002-368798 | 12/2002 |
| JP | 2003-046555 A | 2/2003 |

OTHER PUBLICATIONS

Floyd, Sally, et al., "Random Early Detection Gateways for Congestion Avoidance," *Lawrence Berkeley Laboratory*, University of California (Aug. 1993) pp. 1-6.

(Continued)

*Primary Examiner*—Brenda Pham
(74) *Attorney, Agent, or Firm*—Townsend and Townsend and Crew LLP

(57) ABSTRACT

In one embodiment, a bandwidth monitoring device comprises a packet receiving circuit configured to receive packets; a counter configured to count a total packet length by adding up inputted packet lengths including a packet length of a next input packet and subtracting outputted packet lengths to produce a counted value; a timer configured to time a packet receiving time; a memory configured to store a number of packet receiving times and a number of counted values counted by the counter which correspond to the packet receiving times, respectively; a counter rate-of-change calculating portion configured to calculate a change rate by a first counted value corresponding to an oldest packet receiving time stored in the memory representing an oldest time at which a packet was received and a second counted value corresponding to a latest packet receiving time stored in the memory representing a latest time at which a packet was received; and a determining portion configured to decide whether the next input packet will be discarded based on a probability computed by the change rate and the counted value counted by the counter when the packet receiving circuit receives the next input packet.

16 Claims, 17 Drawing Sheets

OTHER PUBLICATIONS

Hasegawa, Go, et al., "The Dynamic Threthold Control Algorithm of Red for Thousands of TCP Flows," *Cybermedia Center*, Osaka University.

Aimoto, Takeshi, et. al., "Overview of DiffServ Technology: Its Mechanism and Implementation," *IEICE Trans. Inf. & Syst.* (May 2000) vol. E83-D, (No. 5) pp. 957-964.

Allman, M., et. al., "TCP Congestion Control" *RFC 2581* (Apr. 1999) pp. 1-13.

Defense Advanced Research Projects Agency, "Transmission Control Protocol DARPA Internet Program Protocol Specification," *Information Sciences Institute*, University of Southern California (Sep. 1981) pp. i-85.

Japan Patent Office (JPO) office action for JPO application 2003-043863 dated Sep. 18, 2007.

* cited by examiner

BANDWIDTH MONITORING DEVICE

CROSS-REFERENCES TO RELATED APPLICATIONS

This application relates to and claims priority from Japanese Patent Application No. 2003-043863, filed on Feb. 21, 2003, the entire disclosure of which is incorporated herein by reference.

BACKGROUND OF THE INVENTION

The present invention is related to a bandwidth monitoring device, and more particularly to a bandwidth monitoring device for monitoring and controlling a packet bandwidth that flows into a network.

In the packet-switched communications system used by the Internet, because packets from numerous users can, generally speaking, make shared use of the same line, per-bandwidth communications costs can be kept noticeably low. However, by contrast, it becomes difficult to guarantee the QoS (Quality of Service) of communications, such as low latency and low drop rates, and communication modes that cannot be expected to provide best effort quality have been the norm. Demand for services that guarantee low latency, low drop rates and the other such QoS (QoS guaranteed services), which conventional telephone networks and leased line networks have achieved, has grown in line with the rapid development and growth of the Internet, and a framework for Internet and Internet Protocol (IP) network QoS, called Diffserv, has been standardized by the IETF. Diffserv is disclosed, for example, in "Overview of DiffServ Technology: Its Mechanism and Implementation," IEICE Transactions on Information and Systems, Vol. 83, No. 5, pp957-964, 2000 by Takeshi Aimoto, Shigeru Miyake (Reference 1).

A variety of QoS services are proposed under Diffserv (Differentiated Services). For example, a QoS guaranteed service, which is called a premium service, is one that guarantees the low latency, low drop rates and other such QoS achieved via conventional telephone networks and leased line networks, and this is a very important service. In a premium service, pre-guaranteed bandwidth is contracted between the administrators of a user network and the carrier network over which this service is provided, and the carrier network guarantees the contracted bandwidth for the user network. However, when packets in excess of the contracted bandwidth flow into the carrier network from the user network, congestion occurs inside the carrier network, raising the possibility that the above-mentioned contract will not be able to be observed, and running the risk of affecting the traffic and QoS of other users. Accordingly, with Diffserv, the administrator of the carrier network disposes a bandwidth checking function called a UPC (User Parameter Control) function (UPC is the term used in ATM; in IETF terminology, it is also called a policing function) at the entrance of the carrier network in order to observe this contract. When packets in excess of the contracted bandwidth are received from the user network while packets of less than the contracted bandwidth with the user network are being passed, the UPC function protects the bandwidth resources within the carrier network by either dropping packets, or setting their in-network transmission priority lower.

As the bandwidth measurement algorithm in this UPC function, for example, the LB (Leaky Bucket) algorithm and Token Buckets algorithm are known.

FIG. 17 shows a model diagram representing a bandwidth monitoring algorithm. A method for achieving the LB algorithm is disclosed in U.S. Pat. No. 5,007,043 (Japanese Patent No. 2071245) (Reference 2). When using the LB algorithm, bandwidth can be checked while allowing a fixed fluctuation. The LB algorithm will be described using the figure. The LB algorithm can be expressed as a model using a leaky bucket 1003, which has a certain depth, and which has a hole in it. There is a hole in this bucket, water corresponding to packets continues to leak out in a quantity proportional to the monitoring speed (water leak 1002), and water of a quantity corresponding to packet length is poured into the bucket when a packet arrives (water quantity 1005 corresponding to packet length). The bucket is capable of holding water (packets) of a fixed quantity (bucket depth 1004: counter threshold value) in order to allow fluctuations and bursts. When water is poured into the bucket (when packets are inputted), if the water does not leak out of the bucket (if the packet length counter value does not exceed the counter threshold value), it is determined that this packet complies with the monitored bandwidth, and if it does leak out, it is determined that there was a violation.

Reference 2 comprises counter information corresponding to the quantity of water stored in the above-mentioned bucket; threshold value information corresponding to the depth of the bucket; monitored bandwidth information, which is the speed at which the water leaks out, and corresponds to the monitored bandwidth; and lead packet arrival time information, which is the time at which the lead packet arrived. When a cell, which is a fixed-length packet, arrives at the UPC function, first of all, the elapsed time is calculated from the current time and the lead packet arrival time information, and a counter decrement corresponding to the quantity of water that has leaked during this elapsed time is computed from the monitored bandwidth information (Process 1). Next, the counter decrement is subtracted from the counter information, and a counter residual quantity corresponding to the quantity of water in the bucket at the current time is calculated (Process 2). Finally, the value of one cell is added to this counter residual quantity, and when the added value is less than the threshold value information, the input packet is determined to be in "compliance," and when it exceeds the threshold value information, it is determined to be in "violation" (Process 3).

In Reference 1, a bandwidth measurement algorithm that modifies the above-mentioned LB algorithm is also disclosed. With this algorithm, comparison with the threshold value information and a determination as to whether the bucket is in violation or compliance are done prior to adding the value of one cell in Process 3 of the above-mentioned LB algorithm. When a UPC function comprising, for example, the LB algorithm, is used at the entrance of a carrier network like this, it is possible to determine whether or not an input packet from a user complies with the contracted bandwidth.

This UPC algorithm developed for ATM, which transmits fixed-length cells, can also be extended to the Internet (IP networks), which transmits variable-length packets. For example, in Japanese Patent Laid-open No. 2002-368798 "Packet Transmission Device Comprising Bandwidth Monitoring Function", as a bandwidth monitoring function, there is disclosed a system, which can carry out bandwidth monitoring of variable-length packets (either IP packets or L2 frames (for example, Ethernet frames)) with respect to either IP packets or L2 frames according to the desire of the network administrator (Reference 3).

Conversely, in Internet-based data communications, the TCP (Transmission Control Protocol) protocol (For example, refer to J. Postel, "Transmission Control Protocol," STD7, RFC793, September 1981, M. Allman, et al, "TCP Congestion Control," RFC 2581, April 1999, RFC-1122 and 1123) is frequently utilized (Reference 4). This TCP protocol is a higher layer protocol of the IP protocol for IP networks, and establishes a virtual connection between a transmitting terminal and a receiving terminal. For a host application, the TCP protocol is a communication protocol that avoids data communications errors resulting from packet loss, and guarantees reliability. TCP comprises various flow control functions such that throughput deterioration does not occur over the long-term even when a state of congestion arises between the transmitting and receiving terminals in a network. More specifically, flow control is performed in accordance with a slow start phase and a congestion avoidance phase.

When a TCP connection is established, a time-out time corresponding to RTT (Round Trip Time), and a sliding window size initial value 1, which expresses the number of packets that can be transmitted without waiting to receive an ACK (Acknowledge) are set. Changes in the sliding window size of a transmitting terminal resulting from TCP flow control open a sliding window exponentially from the initial value 1 during the slow start phase at connection establishment. When the sliding window opens too much, the bandwidth of the packets being sent over the network becomes too large, resulting in network congestion and packet loss. When the receiving terminal detects packet loss, it responds by sending an ACK relative to the packets that were not received. When the transmitting terminal receives this ACK, it resends the packets, and when it receives an ACK with respect to these packets, since this is a case where a plurality of ACKs are received for the same packets, this phenomenon is called a duplicate ACK. When a duplicate ACK is received from the receiving terminal, the transmitting terminal determines that a slight degree of congestion has occurred, and switches to the congestion avoidance phase. In the congestion avoidance phase, extreme throughput deterioration such as that in the slow start phase can be avoided (since the system does not return to the initial value 1) by closing the sliding window by nearly half of the number of packets resident in the network. By contrast, when the transmitting terminal was unable to receive an ACK during the time-out period, a determination is made that all the transmitted packets were dropped, and that a serious state of congestions exists, and the transmitting terminal initializes the sliding window to 1, and switches over to the slow start phase. As a result, it takes time for the sliding window to recover, and throughput deteriorates sharply. To prevent throughput from deteriorating sharply from the contracted bandwidth, an ACK must be returned so as to avoid lapsing into the slow start state.

When TCP packets (IP packets on the TCP protocol) are subjected to bandwidth monitoring using the UPC function, TCP packets are continuously inputted into the UPC leaky bucket because the sliding window remains open until the transmitting terminal either receives a duplicate ACK or a time-out occurs. In the UPC of Reference 2 or 3, bursty determinations of contracted bandwidth violations are continuously made from the point in time at which the packet length counter information exceeded the counter threshold value. As a result of this, continuous packet dropping commences (because the violating packets are dropped by the monitoring node itself, and by other nodes that are in a state of congestion,) and the transmitting terminal detects a time-out. In this case, the problem was that, in TCP packet bandwidth monitoring using ordinary UPC, it was hard to avoid throughput deterioration resulting from the time-out.

Meanwhile, packet loss also occurs due to congestion in the routers constituting a network (the length of the queue awaiting transmission inside a router increases, resulting in queue overflow). This bursty packet loss resulting from such queue overflow is also a cause of a TCP transmitting terminal switching to the slow start state, and of greatly degraded transmission efficiency. A TCP packet retransmission function retransmits only dropped packets without switching over to the slow start phase if bursty drops are not made. RED (Random Early Detection) technology, which was developed for routers, is an improved method of queue control for a router output queue in Diffserv technology (Reference 1). RED technology is disclosed, for example, in "Random Early Detection Gateways for Congestion Avoidance," by S. Floyd, IEEE/ACM Transaction on Networking, Vol. 1, No. 4, August 1993 (Reference 5) and "RED Dynamic Threshold Control System for Backbone Routers," by Tsuyoshi Hasegawa, Natsuki Itaya, and Masayuki Murata, Institute of Electronics, Information and Communications Engineers (IEICE) Technical Report (NS2001-11), April 2001 (Reference 6). With RED technology, it is possible to artificially create a slight congestion condition, and guide a TCP packet-transmitting terminal to operate in the congestion avoidance phase by randomly dropping packets at a frequency corresponding to the degree of congestion in an initial state of output congestion in a router output queue. This has the outstanding effect of enabling transmission without lapsing into a slow start state, and without causing a large drop in transmitting terminal throughput.

However, RED technology (Reference 5) is a technology, which is applied to the queue control function of a router output port for inhibiting the deterioration of TCP packet throughput; it is not a function for inhibiting the deterioration of TCP packet throughput in the UPC function, which detects and checks packets from a user network at the input port. There has been a need for a bandwidth checking function that prevents the deterioration of TCP throughput while checking the transmission bandwidth from the user network (or transmitting terminal) with respect to a contracted bandwidth value at the connection part of the user network and the carrier network: UNI (User Network Interface).

As described hereinabove, when carrying out bandwidth monitoring of TCP packets (IP packets on the TCP protocol) using the UPC function, since the sliding window remains open until a duplicate ACK is received by the transmitting terminal or a time-out occurs, TCP packets are continuously inputted into the UPC leaky bucket. With conventional UPC technology (Reference 2 or 3), bursty determinations of contracted bandwidth violations are continuously made from the point in time at which the packet length counter information exceeded the counter threshold value. As a result, continuous packet dropping commences (because the violating packets are dropped by the monitoring node itself, and by other nodes that are in a state of congestion,) and the transmitting terminal detects a time-out. Thus, the problem was that, in TCP packet bandwidth monitoring using ordinary UPC, it was hard to avoid throughput deterioration resulting from a time-out.

This will be explained using FIG. 17. When the quantity of water 1005 corresponding to packet length (input packet speed) exceeds the quantity of water leaking out 1002 (contracted bandwidth), a quantity of water 1001 (packets) is accumulated in a bucket 1003 (speed fluctuation buffer) for checking bandwidth while permitting a fixed fluctuation. In a state in which a certain quantity of water 1001 has accumulated, when water quantity 1005 continues to be inputted in excess of the quantity of leaking water 1002, the bucket depth 1004 (counter threshold value) is exceeded. Thus, the input packets to the speed fluctuation buffer are continuously determined to be "contracted bandwidth violations." TCP packets are dropped in a burst-like fashion at this time, the above-described TCP slow start function is activated, and TCP throughput greatly deteriorates. As a result, the problem was that, conventionally, the communications service received by a user was limited to a state that fell far short of the contracted bandwidth, and it was not possible to utilize the contracted bandwidth effectively. This is the cause of all packets being dropped when the packet length counter value of the LB algorithm exceeds the counter threshold value. So that throughput does not deteriorate much from the contracted bandwidth, an ACK must be returned so as to avoid lapsing into the slow start state.

BRIEF SUMMARY OF THE INVENTION

A feature of the present invention is to avoid bursty drops in favor of dropping packets at random even when there is a bursty inflow of TCP packets by comprising a bandwidth monitoring portion having a predetermined algorithm. Another feature of the present invention is to avoid bandwidth deterioration resulting from TCP flow control restarting from the slow start phase, and to make it possible for a user to more effectively use contracted bandwidth by randomly dropping packets like this.

In addition, another feature of the present invention is to inhibit bursty packet dropping, and also, for example, to solve the problems by providing a bandwidth monitoring portion having a predetermined algorithm.

Other features of the present invention include:

(1) To avoid excessive dropping when the rate of change is decremental (less than 100%) even when the packet length counter value is high;

(2) To quickly inhibit congestion by setting the drop probability high when the rate of change of the counter value is extremely high even while the packet length counter value is relatively low; and (3) To make it difficult for packet length counter value changes to occur and to avoid excessive dropping in the case of a small burst.

Embodiments of the invention provide a bandwidth monitoring device of a packet relay device that does not drop all the packets when the packet length counter value of the LB algorithm, which carries out bandwidth monitoring, exceeds a counter threshold value, but rather provides a way to determine a monitored bandwidth violation from a certain small probability that a change will occur in line with a counter value increment, and to intentionally drop a packet in a state wherein a certain threshold value that is smaller than the counter threshold value has been exceeded. This artificially creates a slight congestion condition, and guides TCP to operate in the congestion avoidance phase. This also makes it possible to transmit without lapsing into a slow start state, and transmitting terminal throughput does not deteriorate much. In addition, the probability that a violation will be determined increases in accordance with an increase in the water level. This makes it possible to raise the frequency at which a small number of packets is randomly dropped as the counter value approaches its upper limit within the scope of allowable fluctuation in bandwidth monitoring, and makes it possible to more actively guide the TCP packet transmitting terminal to operate in the congestion avoidance phase. When the counter value exceeds the counter threshold value yet further despite this slight congestion condition, and the TCP transmitting terminal is not expected to adhere to congestion control, the bandwidth monitoring device provides a way to determine that all the packets violate the monitored bandwidth. To realize this mechanism, an exemplary embodiment utilizes a threshold value for starting probabilistic violation determinations, and a gradient value for deciding the probability thereof.

Further, by raising the frequency at which small numbers of packets are randomly dropped when counter value changes are incremental, and lowering the frequency at which small numbers of packets are randomly dropped when counter value changes are decremental, unnecessary packet dropping can be avoided, and the TCP sliding window can be activated more efficiently. To realize this function, a bandwidth monitoring device of a packet relay device of specific embodiments of the present invention further comprises a way to store past receiving times and counter values, and drops packets according to a drop probability that takes into consideration the rate of change of the current counter value.

DETAILED DESCRIPTION OF THE INVENTION

1. Network Configuration

Figure 1:
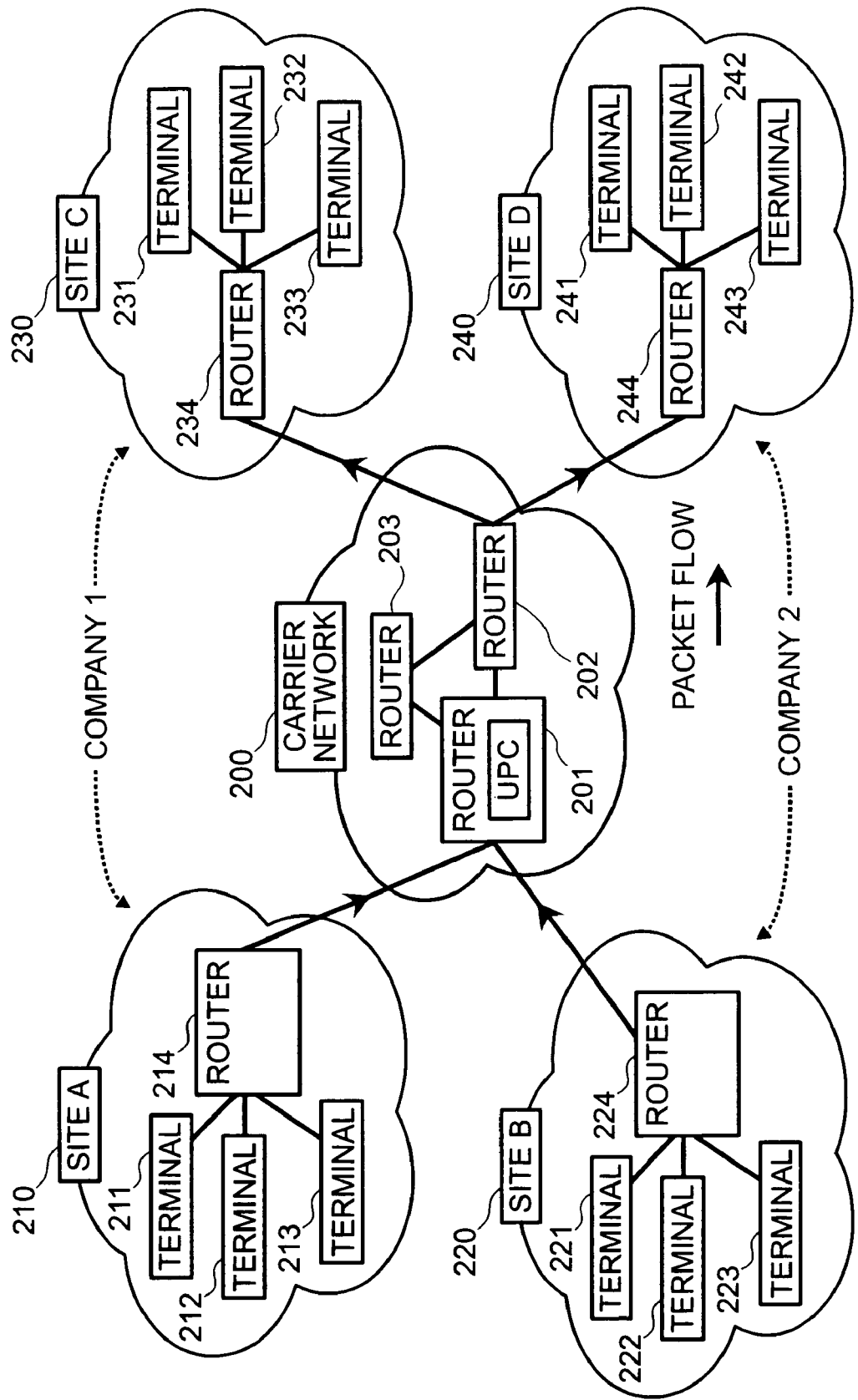
FIG. 1 is a block diagram of a network.

FIG. 1 shows a block diagram of an IP network on which the exemplary embodiment is premised. Site A 210 and Site C 230 of Company 1, and Site B 220 and Site D 240 of Company 2 have each concluded contracts with a carrier network 200 for QoS guaranteed services, called premium services, which guarantee low latency and low drop rates. Company 1 has filed with the carrier network in advance for a contracted bandwidth of 10 Mbps, and Company 2 has filed with the carrier network in advance for a contracted bandwidth of 5 Mbps. A router 214 at Site A 210 comprises a shaping function, and it shapes the bandwidth within which terminals 211, 212, 213 transmit to a contracted bandwidth of 10 Mbps or less, and transmit over the carrier network 200. Similarly, a router 224 at Site B 220 comprises a shaping function, and it shapes the bandwidth within which terminals 221, 222, 223 transmit, and controls the traffic from each terminal flowing into the carrier network 200 to a contracted bandwidth of 5 Mbps or less. On the carrier network 200 side, a bandwidth monitoring portion 500 (see FIG. 2) inside a router 201 comprises a UPC function, and this bandwidth monitoring portion 500 carries out bandwidth monitoring to determine if the bandwidth within which router 214 of Site A and router 224 of Site B transmit complies with the contract, preventing excess traffic of greater than the contracted bandwidth from flowing into the carrier network 200.

After carrying out bandwidth monitoring, the carrier network 200 transmits traffic from router 214 at Site A and router 224 at Site B to router 234 at Site C 230 and router 244 at Site D 240, respectively, then router 234 transmits traffic to terminals 231, 232, 233, and router 244 transmits traffic to terminals 241, 242, 243.

Furthermore, this figure shows an IP network constituting routers 201, 202, 203, 214, 224, 234 and 244, but a device for implementing a bandwidth monitoring function (or bandwidth monitoring portion) according to the present embodiment is not limited to routers. For example, it is also possible to constitute a network using L2 technology, such as Ethernet switches, ATM switches, or MPLS-switched nodes. Further, bandwidth monitoring devices can also be disposed separate from router 201, at locations between router 201 and routers 214 and 224.

2. Example of a Router Configuration

An operational overview of a router 100 comprising a bandwidth monitoring portion (router 201 in FIG. 1) will be explained.

Figure 2:
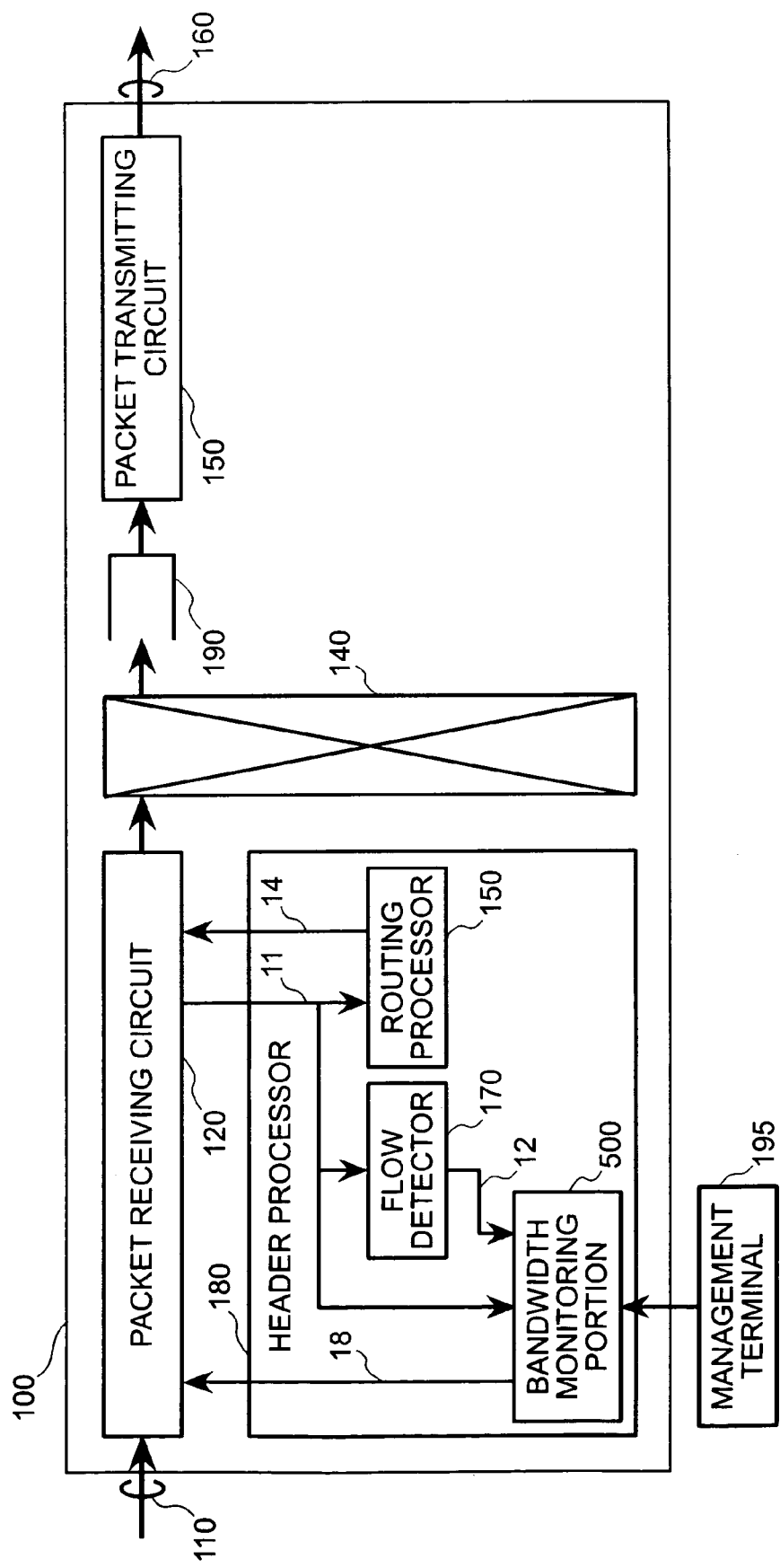
FIG. 2 is a block diagram showing the constitution of a router 100 according to an embodiment of the present invention.

FIG. 2 is a block diagram of router 100. Router 100 comprises an input line 110 via which packets are inputted; a packet receiving circuit 120 for carrying out packet reception processing; a header processor 180 comprising a routing processor 150 for determining an output line number, which is the identifier of an output line 160 via which packets are outputted, a flow detector 170 for detecting a packet flow, and a bandwidth monitoring portion 500; a packet relay processing module 140 for switching a packet based on an output line number; a packet transmitting circuit 150 for reading out a packet from a transmitting side buffer 190 and carrying out packet transmission processing; and an output line 160 for outputting a packet. Also, a management terminal 195 for managing the router 100 and making various settings is connected to the router 100. In this figure, one input line 110 and one output line 160, respectively, are disclosed, but in reality, router 100 comprises a plurality of input lines 110, a plurality of packet receiving circuits 120, a plurality of header processors 180, a plurality of transmission buffers 190, a plurality of packet transmitting circuits 150, and a plurality of output lines 160.

Figure 3:
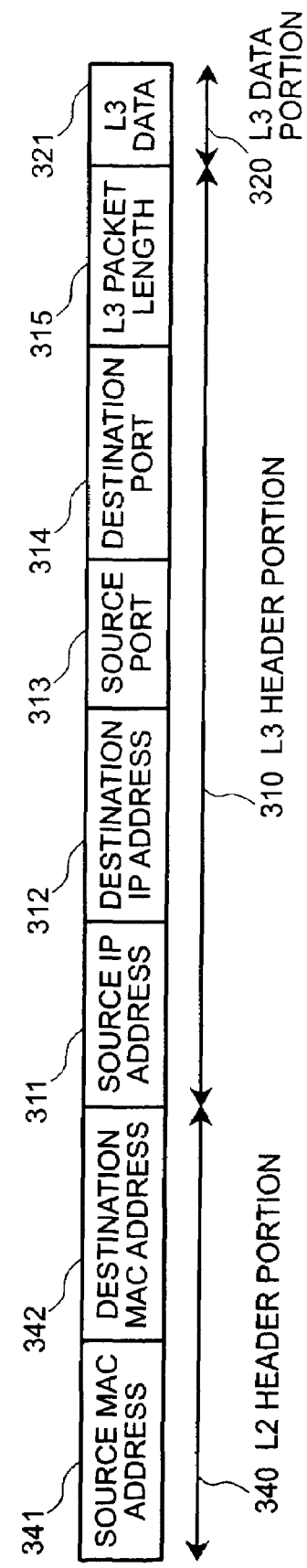
FIG. 3 is a diagram showing the packet format in the IP network of FIG. 1.

FIG. 3 shows the packet format for the IP network of FIG. 1. In this example, a packet comprises an L2 header portion 340, an L3 header portion 310 and an L3 data portion 320. The L2 header portion 340 is a link layer (L2) packet header, and is constituted from information (L2 address information and the like) that will differ according to the type of packet input line (Ethernet, Frame Relay, and so forth). In this figure, as an example, the input line is treated as an Ethernet line. In this example, the L2 header portion 340 comprises a source MAC address (L2 address of the output port of the node, which sent the packet to this router) 341; and a destination MAC address (L2 address of the input port of this router) 342. The L3 header portion 310 is a network layer (L3) packet header, and comprises a source IP address 311, which is a source address (L3 address of the transmitting terminal); a destination IP address 312, which is a destination address (L3 address of the receiving terminal); a source port number 313 which represents the source protocol (=host application), and a destination port number 314 which represents the protocol of the destination; and the L3 packet length 315, which is the number of bytes achieved by adding the header portion 310 to the data portion 320. Further, the L3 data portion 320 comprises L3 data 321, which is user data.

Figure 4:
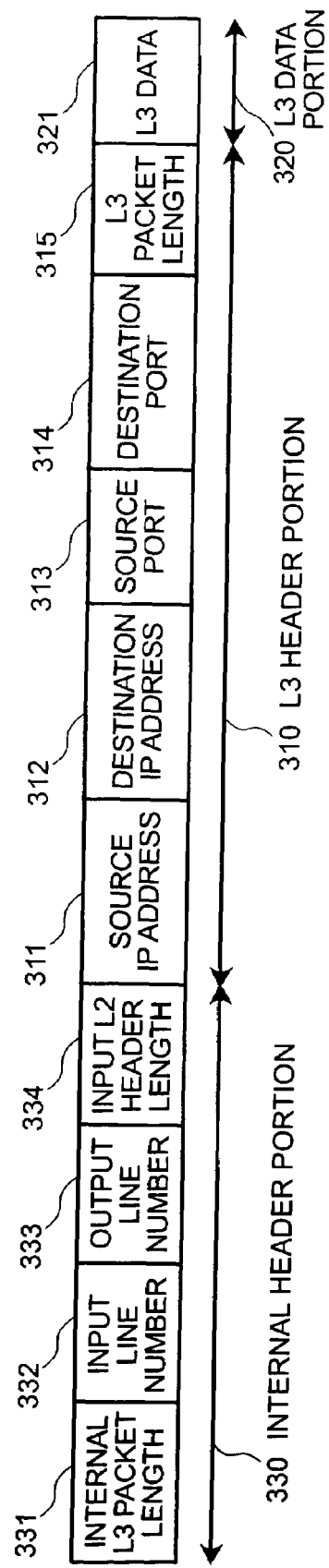
FIG. 4 is a diagram showing the packet format in router 100.

FIG. 4 shows the packet format on the inside of the router 100. The internal packet format of the router 100 comprises the L3 header portion 310 and L3 data portion 320 of the packet in the IP network of FIG. 1, and a new internal header portion 330. This internal header portion 330 comprises an internal L3 packet length 331, which represents the number of bytes in the packet; an input line number, which is the identifier of the line via which the packet was inputted; an output line number, which is the identifier of the line via which the packet will be outputted; and an input L2 header length 334, which is the length of the L2 header corresponding to the type of input line.

Next, an overview of the operation of the router 100 will be explained. A packet is first inputted from input line 110 to packet receiving circuit 120.

Figure 5:
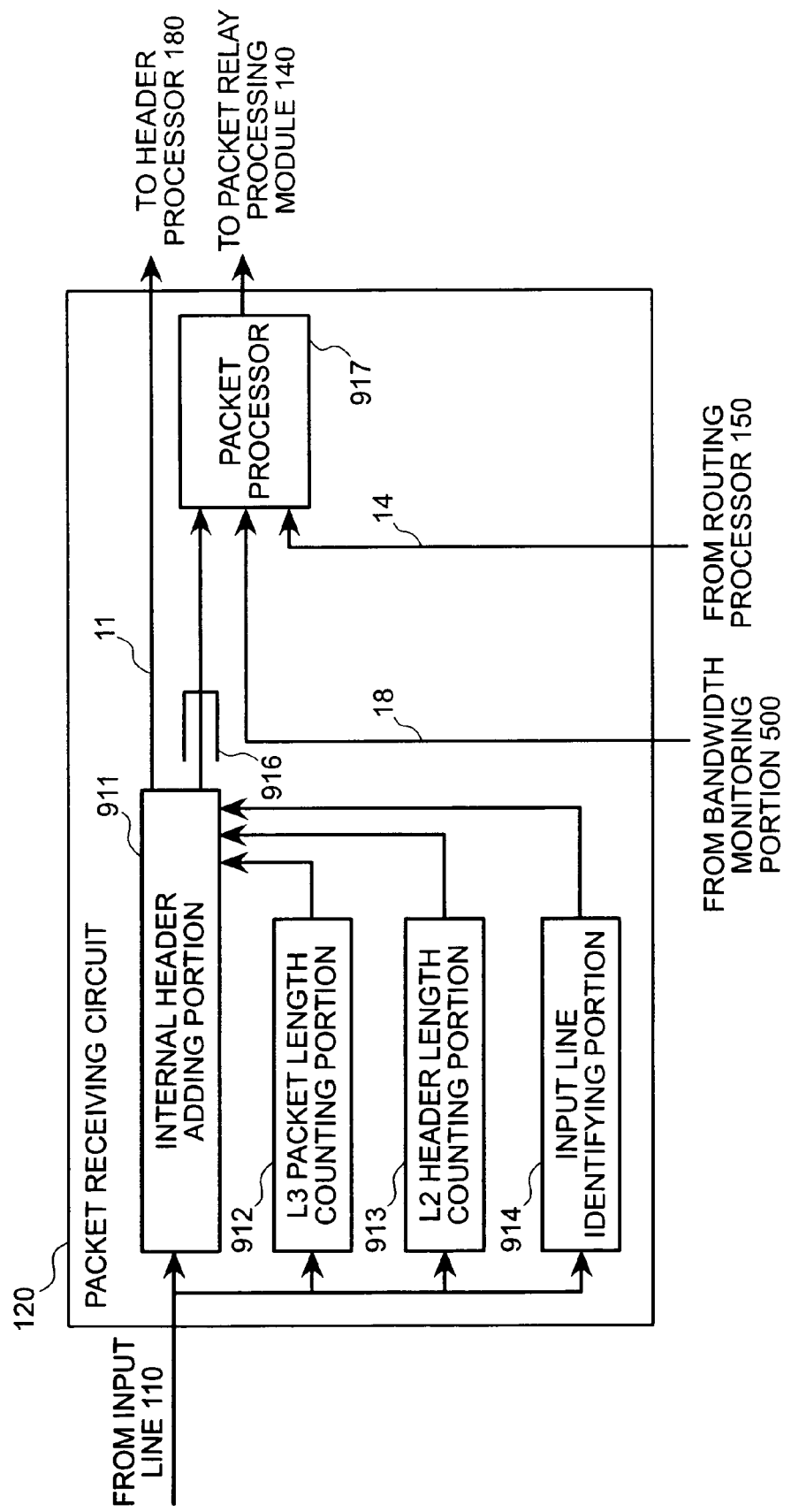
FIG. 5 is a block diagram of a packet receiving circuit in router 100.

FIG. 5 shows a block diagram of a packet receiving circuit 120. When a packet is inputted to the packet receiving circuit 120, an L3 packet length counting portion 912 counts the combined number of bytes in the L3 header portion 310 and L3 data portion 320 of the inputted packet, and sends this number to an internal header adding portion 911. An L2 header length counting portion 913 counts the number of bytes in the L2 header portion 340 of the inputted packet, and sends this number to the internal header adding portion 911. An input line identifying portion 914 sends the identifier of the input line 110 via which the packet was inputted to the internal header adding portion 911. The internal header adding portion 911 deletes the L2 header portion of the inputted packet and adds the internal header portion 330, writes the number of bytes received from the L3 packet length counting portion 912 into the L3 packet length 331, and writes the number of bytes received from the L2 header length counting portion 913 into the inputted L2 header length 334, and writes the identifier received from the input line identifying portion 914 into the input line number 332. Furthermore, the L2 header is deleted so that the router 100 operates as a router. In the case of an Ethernet switch, the L2 header is not deleted, and instead is sent to the header processor 150. In addition, the packet receiving circuit 120 temporarily stores the inputted packet in a buffer 916, and at the same time, sends packet header information 11 comprising the internal header portion 330 and header portion 310 to header processor 180. The output line number 333 is still a meaningless value at this time.

The flow detector 170 of the header processor 180 in FIG. 2 detects the flow from the packet header information 11. Flow refers to the flow of a series of packets determined by a set of information, such as, for example, a destination IP address, a source IP address, destination port information, and source port information. Flow detecting conditions are set in the flow detector 170 beforehand from the management terminal 195. When the flow detector 170 detects the flow, it sends a flow identifier 12, which is flow identification information, to the bandwidth monitoring portion 500. Bandwidth monitoring conditions are set in the bandwidth monitoring portion 500 beforehand from the management terminal 195. The bandwidth monitoring portion 500 executes bandwidth monitoring for each flow identifier 12, and sends bandwidth monitoring results 18 indicating "compliance" or "violation" to the packet receiving circuit 120. The flow detecting conditions and bandwidth monitoring conditions set by the management terminal 195 are conditions such as "The packet flow from Company 1 is 10 Mbps, and the packet flow from Company 2 is 5 Mbps" written as the above-described flow conditions. In the meantime, the routing processor 150 of the header processor 180 determines the identifier of the output line 160 via which the packet will be outputted based on the destination IP address 312 inside the packet header information 11, and sends this identifier to the packet receiving circuit 120 as packet output line information 14.

A packet processor 917 in the packet receiving circuit 120 of FIG. 5 writes the packet output line information 14 into the output line number 333, and when the bandwidth monitoring results are "compliance," sends the stored packet to packet relay processing module 140. When the bandwidth monitoring results are "violation," the packet processor 917 either drops the stored packet, or resets its priority in the network to a lower priority.

The packet relay processing module 140 of FIG. 2 switches a packet in accordance with the output line number 333, and sends a packet to the transmitting side buffer 190 of each output line 160. The transmitting side buffer 190 is a buffer provided to prevent packet dropping by storing a packet when an inputted packet exceeds the bandwidth of the output line 160. However, when packets that exceed the bandwidth of the output line 160 are inputted for a long period of time, the transmitting side buffer 190 drops the packets. The packet transmitting circuit 150 reads out from the transmitting side buffer 190 a packet with a bandwidth corresponding to the output line 160, deletes the internal header portion 330, adds an L2 header portion 340, writes its own node address in the source MAC address 341, writes the address of the node to which the packet will be inputted next in the destination MAC address 342, and sends the packet to the output line 160.

Next, the operation of the bandwidth monitoring portion 500 will be explained in detail.

Figure 6:
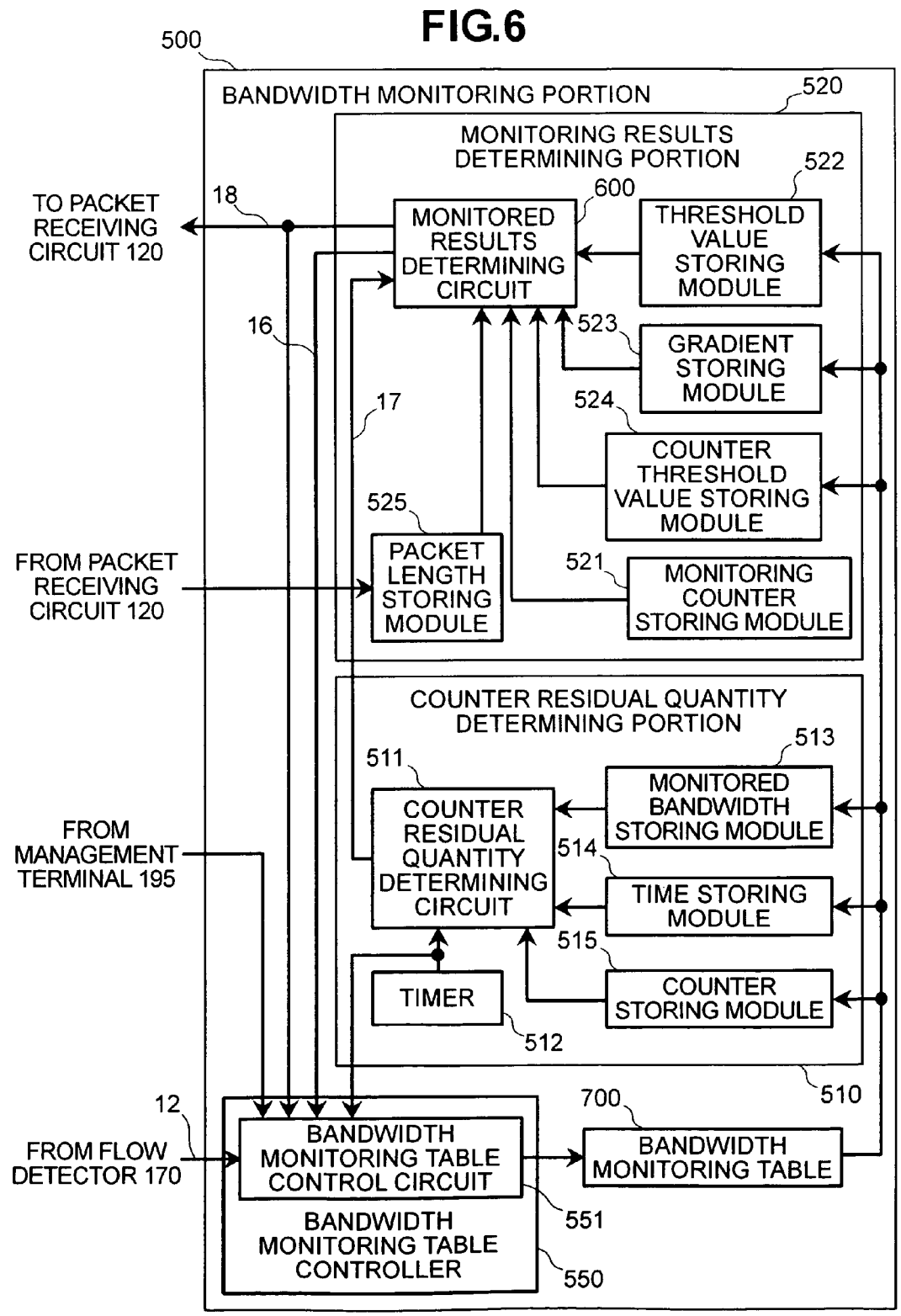
FIG. 6 is a block diagram showing the constitution of a bandwidth monitoring portion 500 in router 100.

FIG. 6 shows a block diagram of a bandwidth monitoring portion 500. The bandwidth monitoring portion 500 comprises a bandwidth monitoring table 700 for storing the bandwidth monitoring information of each flow corresponding to a flow identifier; a bandwidth monitoring table controller 550 for reading out bandwidth monitoring information corresponding to the flow identifier of an inputted packet from the bandwidth monitoring table 700; a counter residual quantity determining portion 510 for determining the residual quantity of a counter, which is incremented and decremented in accordance with the flow of packets; and a monitoring results determining portion 520 for determining whether or not the bandwidth of an inputted packet is in compliance with the monitored bandwidth. The bandwidth monitoring table 700 is stored in a not-shown storage device provided, for example, in the bandwidth monitoring portion 500.

When a packet is received, the bandwidth monitoring portion 500 determines the results of monitoring based on the packet length information of a variable length packet sent from the packet receiving circuit 120, and a flow identifier sent from the flow detector 170, and sends the bandwidth monitoring results information 18 to the packet receiving circuit 120. This bandwidth monitoring portion 500 executes variable-length packet bandwidth monitoring by treating the counter increment of the above-mentioned Reference 2 as the number of bytes of the inputted packet (bandwidth monitoring of variable length packets is implemented using this method in Reference 3). The packet length information of this variable-length packet is held in a packet length storing module 525, and sent to monitoring results determining circuit 600.

Figure 7:
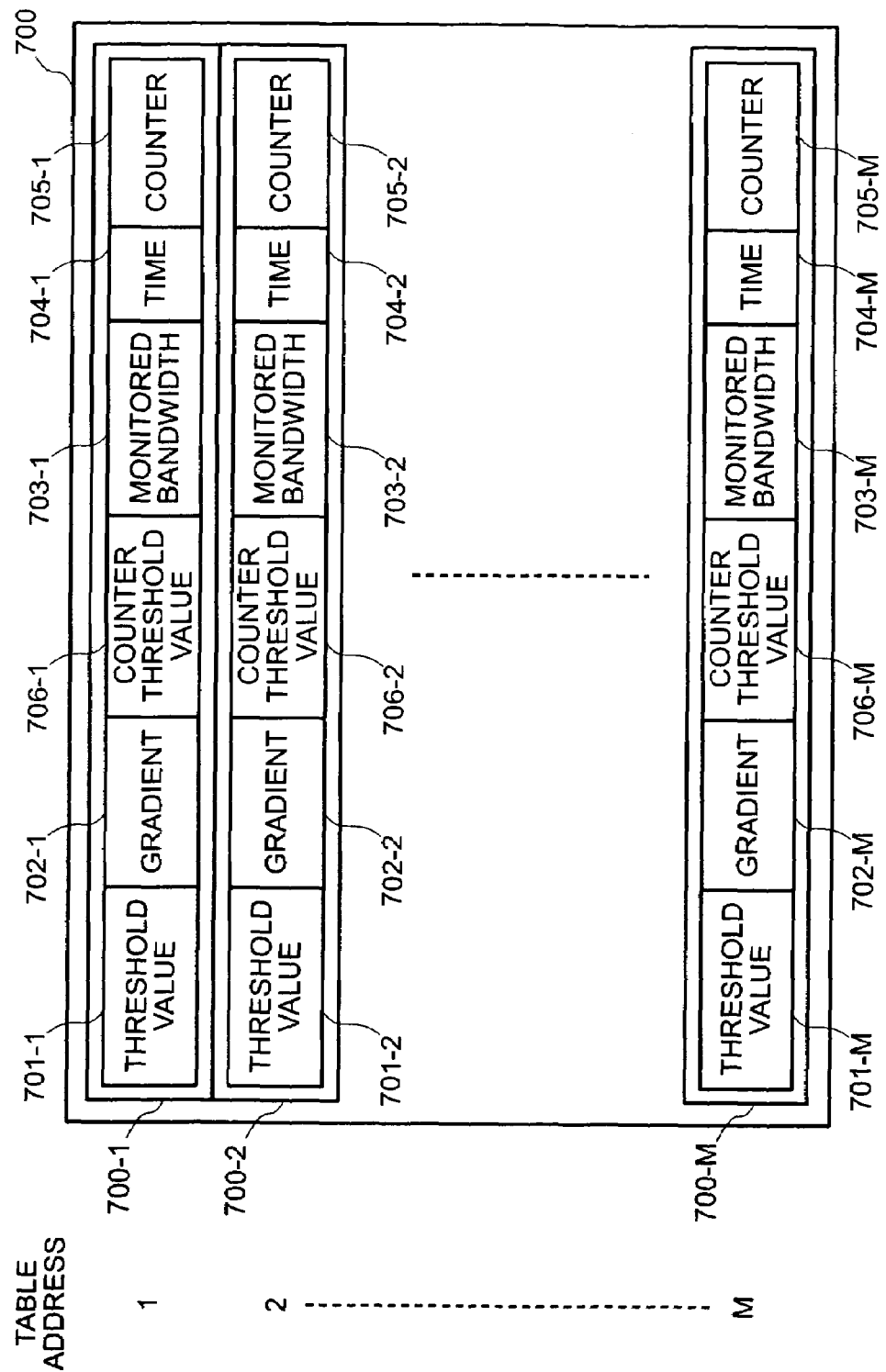
FIG. 7 is a diagram showing the format of a bandwidth monitoring table 700 in the bandwidth monitoring portion 500.

FIG. 7 shows the format of the bandwidth monitoring table 700. The bandwidth monitoring table 700 is constituted from M items of bandwidth monitoring control information 700-$k$ ($k$=1 through M). The bandwidth monitoring portion 500 executes bandwidth monitoring for one user in accordance with one item of bandwidth monitoring control information 700-$k$ corresponding to a flow identifier 12. This bandwidth monitoring control information 700-$k$ is made up of a threshold value 701-$k$ (Byte), which is a threshold value for determining a violation in accordance with a probability of change corresponding to a packet length counter value; a gradient 702-$k$ for deciding a probability for determining compliance or a violation; a monitored bandwidth 703-$k$ (Byte/sec) for indicating the monitoring rate; a time 704-$k$ (sec) when it was determined that a packet, which references the same bandwidth monitoring control information 700-$k$ ($k$=1 through M), is in compliance with the preceding monitored bandwidth; a counter 705-$k$ (Byte), which is the counter residual quantity of the time 704-$k$ (packet length counter value); and a counter threshold value 706-$k$ (Byte) equivalent to the depth of the bucket in the LB algorithm. With the exception of the time 704-$k$ (sec) and counter 705-$k$ (Byte), these items of information are set by the management terminal 195.

Using the threshold value 701-$k$ and gradient 702-$k$ to change the probability for determining compliance or violation is one of the characteristics of the bandwidth monitoring portion 500. Bursty packet dropping can be held in check by making changes so as to monotonically increase the probability at which an inputted packet, which exceeds the threshold value 701-$k$, is determined to be in violation (this will be described hereinbelow using FIG. 10).

Figure 8:
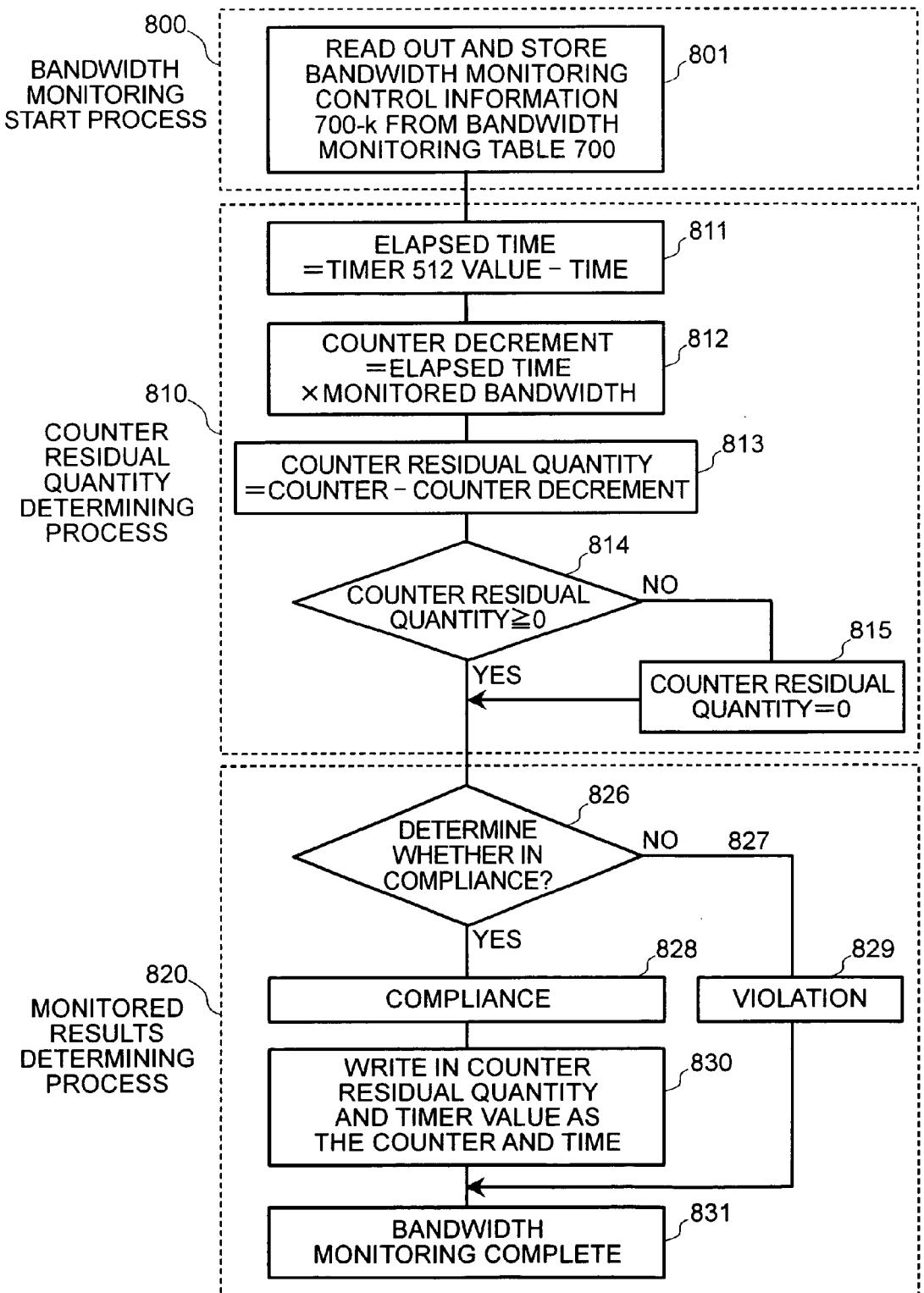
FIG. 8 is a flowchart of the processes executed by the bandwidth monitoring portion 500 according to an embodiment of the present invention.

FIG. 8 shows a flowchart of processing executed by the bandwidth monitoring portion 500. Bandwidth monitoring portion 500 processing comprises a bandwidth monitoring start process 800, a counter residual quantity determining process 810, and a monitoring results determining process 820. The counter residual quantity determining process 810 is executed primarily by the counter residual quantity determining portion 510, and the monitoring results determining process 820 is executed primarily by the monitoring results determining portion 520.

In the bandwidth monitoring start process 800, when the bandwidth monitoring portion 500 receives flow identifier information 12 detected by the flow detector 170, the bandwidth monitoring table control circuit 551 creates a bandwidth monitoring table 700 address, and reads out the bandwidth monitoring control information 700-$k$. The bandwidth monitoring table control circuit 551 stores the threshold value 701-$k$, gradient 702-$k$ and counter threshold value 706-$k$ in the threshold storing module 522, the gradient storing module 523 and the counter threshold value storing module 524, respectively, inside the monitoring results determining portion 520, and stores the monitored bandwidth 703-$k$, time 704-$k$ and counter 705-$k$ in the monitored bandwidth storing module 513, time storing module 514, and counter storing module 515, respectively, of the counter residual quantity determining portion 510 (Step 801).

In the counter residual quantity determining process 810, the counter residual quantity determining portion 510 determined the counter residual quantity immediately prior to packet input. First, the counter residual quantity determining circuit 511 computes the difference between the value of timer 512 for counting the current time (unit: sec), and the time 704-$k$ (sec) inside the time storing module 514, and computes the elapsed time, which has passed since it was determined that a packet having the same flow identifier as the inputted packet was in compliance with the previous monitored bandwidth (Step 811). Next, the counter residual quantity determining portion 510 multiplies the elapsed time (sec) by monitored bandwidth 703-$k$ (Byte/sec) inside the monitored bandwidth storing module 513, and computes the counter decrement from when the preceding packet was determined to be in compliance until immediately prior to packet input (Step 812). In addition, the counter residual quantity determining portion 510 subtracts the counter decrement from the counter 705-$k$ inside the counter storing module 515, and determines the counter residual quantity immediately prior to the packet being inputted (Step 813). The counter residual quantity is determined to be positive or negative (Step 814), and when the determined result is negative, the counter residual quantity is revised to "0" (the counter is emptied) (Step 815). When the determining process is over, the counter residual quantity determining circuit 511 sends the determined results to the monitoring results determining circuit 600 of the monitoring results determining portion 520.

In the monitoring results determining process 820, the monitoring results determining circuit 600 of the monitoring results determining portion 520 determines whether the monitored bandwidth is in compliance or in violation. The contents of the monitoring results determining process 820 will be explained in detail hereinbelow using FIG. 8 and FIG. 9.

Figure 9:
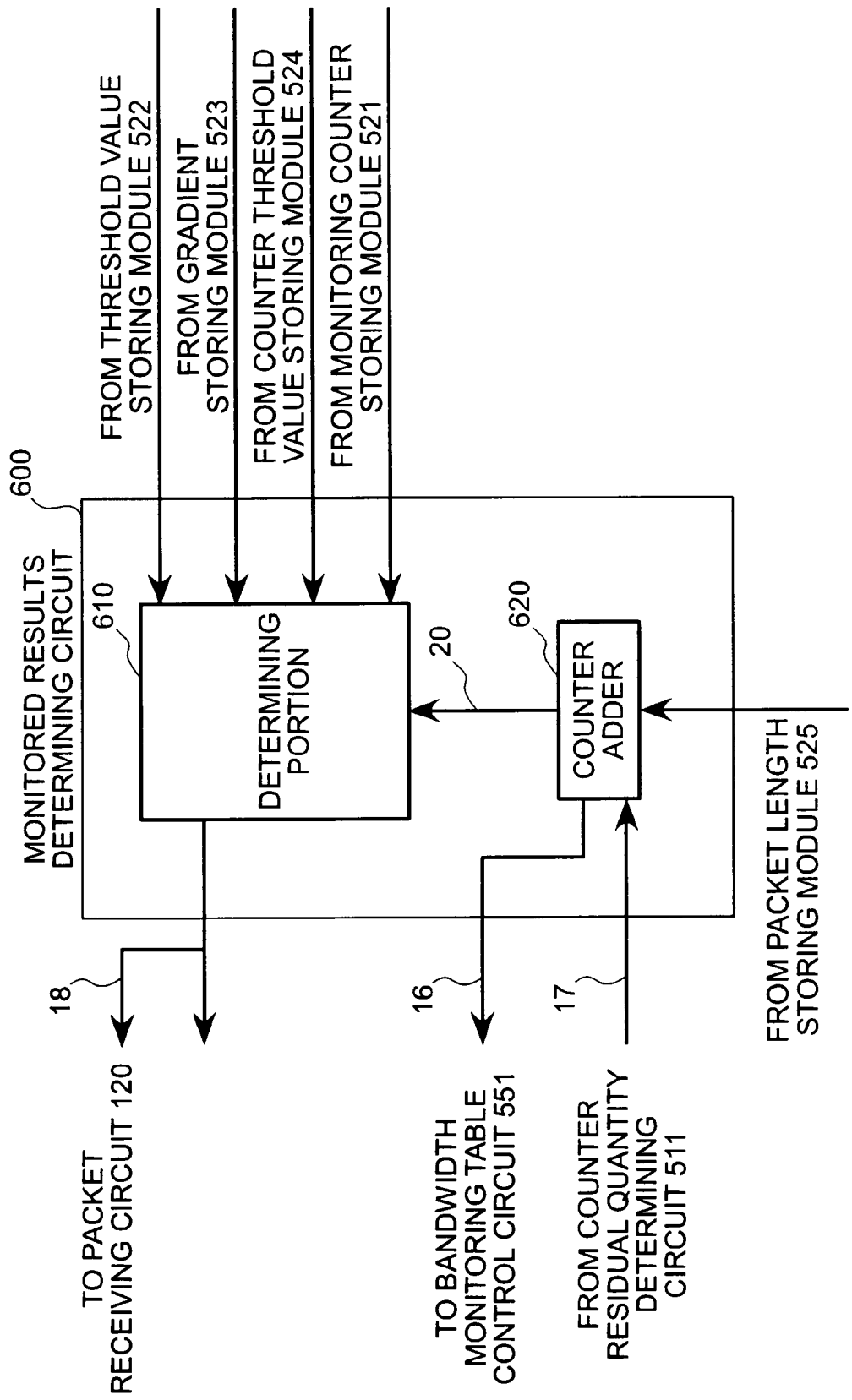
FIG. 9 is a block diagram of a monitoring results determining circuit 600 in the bandwidth monitoring portion 500.

FIG. 9 shows a block diagram of the monitoring results determining circuit 600. The monitoring results determining circuit 600 comprises a determining portion 610 and a counter adding portion 620. The counter adding portion 620 adds counter residual quantity information 17 determined by the counter residual quantity determining circuit 511 to packet length information (Byte) sent from the packet length storing module, and sends the added value 20 to the determining portion 610 and the bandwidth monitoring table control circuit 551. This added value 20 indicates the pre-determination packet length counter value of the received packet. The determining portion 610 receives this added value 20. The determining portion 610 also receives the output value of the monitoring counter storing module 521, which randomly outputs any random number value from 0 through 10 in accordance with a random number generating algorithm, a threshold value 701-$k$ sent from the threshold value storing module 522, a gradient 702-$k$ sent from the gradient storing module 523, and a counter threshold value 706-$k$ sent from the counter threshold value storing module 524, respectively.

Figure 10:
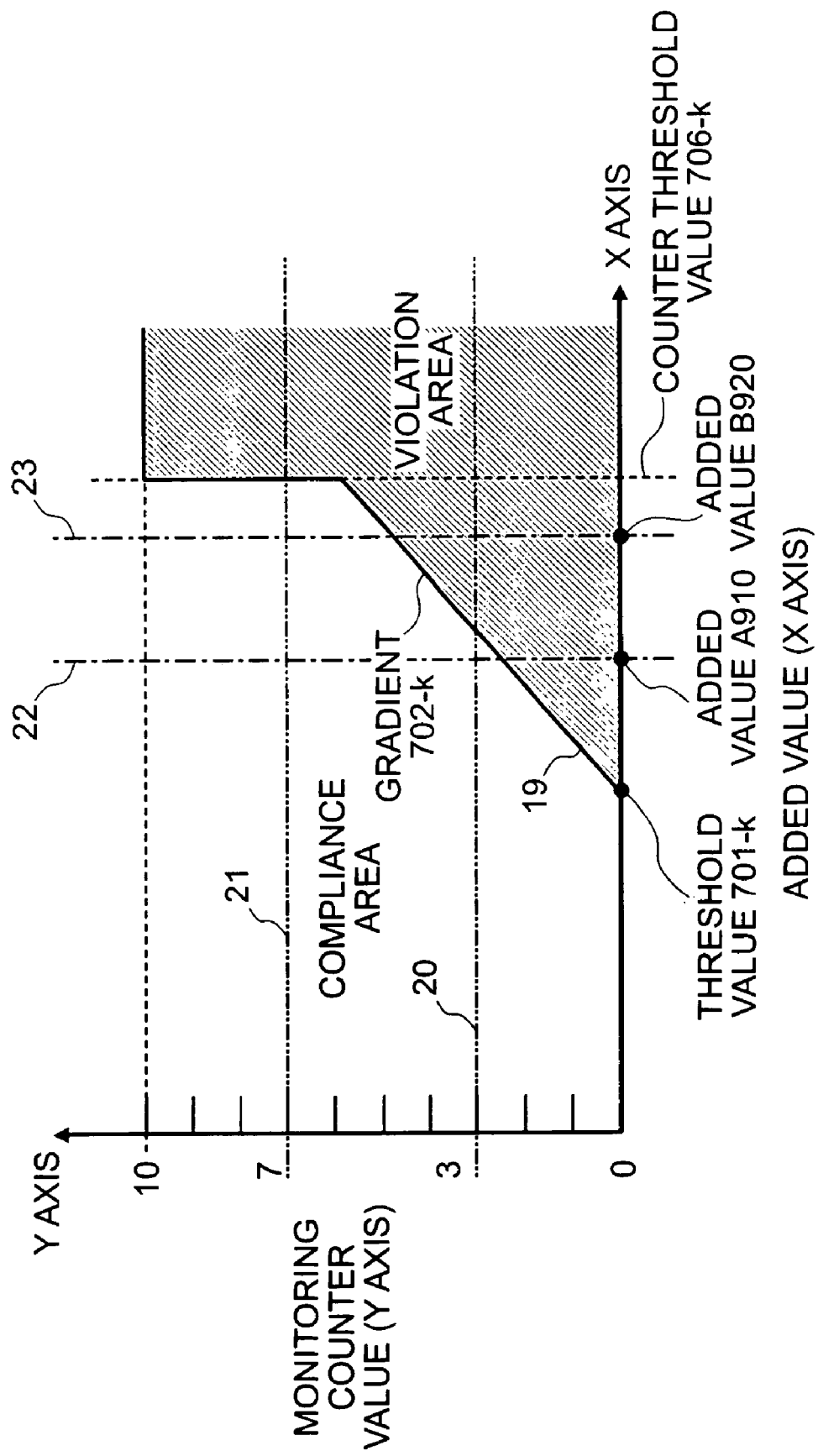
FIG. 10 is a graph showing a determination algorithm according to an embodiment of the present invention.

The determining portion 610 determines whether a packet is in "compliance" or in "violation" based on the determination algorithm shown in FIG. 10 on the basis of the added value 20 and the monitoring counter value (Step 826). The object of Step 826 is to artificially create a slight congestion condition, and guide the TCP packet transmitting terminal to operate in the congestion avoidance phase by randomly dropping a small number of packets within the scope of allowable fluctuation for bandwidth monitoring.

The determination algorithm of the determination (Step 826) carried out by the determining portion 610 will be explained using FIG. 10. This figure is a graph, which represents the monitoring counter value outputted from the monitoring counter storing module 521 on the Y axis, and the added value 20 on the X axis. In the graph, there are a straight line (solid line) 19, which is computed from the threshold value 701-$k$ (X intercept) and gradient 702-$k$, a straight line (solid line) stipulated by the counter threshold value 706-$k$, and a straight line (solid line) for a Y-axis value equal to 10. Of the areas delineated by these three straight lines, the area on the right side (or lower side) is the violation area, and the area of the left side (or upper side) is the compliance area. These respective areas show the probability that a received packet will be determined to either be in compliance or violation. Furthermore, according to either Reference 2 or Reference 3, the right side of a straight line stipulated simply by the counter threshold value 706-$k$ in the graph shown in FIG. 10 would constitute the violation area, and the left side would constitute the compliance area.

In FIG. 10, when a certain flow is detected, it is supposed that the value of the predetermination added value 20 was added value A910. At this time, when the monitoring counter value, which takes a random value, is between 0 and 2, the received packet is determined to be in violation, and when the monitoring counter value is between 3 and 10, the received packet is determined to be in compliance. Conversely, when it was added value B920, when the monitoring counter value is between 0 and 4, the received packet is determined to be in violation, and when it is between 5 and 10, the received packet is determined to be in compliance. In other words, in the case of added value A910, the probability that a violation will be determined (drop probability) is 3/11, and in the case of added value B920, the probability that a violation will be determined (drop probability) is 5/11 (for details, see Step 826).

Next, the monitoring results determining circuit 600 sends bandwidth monitoring results information 18, which indicates whether this packet is in "compliance" or in "violation," to the bandwidth monitoring table control circuit 551 and packet transmitting circuit 150 (Steps 828 and 829).

When the bandwidth monitoring table control circuit 551 receives bandwidth monitoring results information 18 that indicates "compliance," it writes the counter residual quantity information 16 and timer 512 value into the counter 705-$k$ and time 704-$k$ of bandwidth monitoring table 700 as the counter residual quantity and packet arrival time, respectively, immediately subsequent to bandwidth monitoring (Step 830). When the bandwidth monitoring table control circuit 551 receives bandwidth monitoring results information 18 that indicates "violation," Step 830 is not carried out. When the above process is over, bandwidth monitoring ends (Step 831).

Thus, the bandwidth monitoring portion 500 in this example can make a probabilistic determination as to compliance or violation based on a pre-determination added value 20. In accordance with this determined result, it is possible to artificially create a slight congestion condition, and guide the TCP packet transmitting terminal to operate in the congestion avoidance phase by randomly dropping a small number of packets within the scope of allowable fluctuation for bandwidth monitoring. Further, the probability of a violation being determined will increase in accordance with an increase in the added value 20. Accordingly, this makes it possible to raise the frequency at which a small number of packets is randomly dropped as the counter threshold value is approached within the scope of allowable fluctuation in bandwidth monitoring, and makes it possible to more actively guide the TCP packet transmitting terminal to operate in the congestion avoidance phase.

3. Modified Example of a Bandwidth Monitoring Portion

A modified example of the above-described bandwidth monitoring portion 500 will be explained next.

In the above-described bandwidth monitoring portion 500, having a threshold value 701-$k$ and gradient 702-$k$ for changing the probability for making compliance and violation determinations was one of the characteristic features. Accordingly, it becomes possible to hold bursty packet dropping in check by making changes so as to monotonically increase the probability at which an inputted packet, which exceeds the threshold value 701-$k$, is determined as a violation. Conversely, the bandwidth monitoring portion 1300 of FIG. 12, which will be explained hereinbelow, changes the grade of the monotonically increasing gradient 702-$k$ by taking into consideration the rate of change of a preceding packet length counter value and the current packet length counter value. Bandwidth monitoring portion 1300 comprises a storage module for storing N number of preceding packet reception times and the packet length counter values at those times, and drops packets according to a drop probability that takes into consideration the rate of change of a counter value determined from the current counter value and a preceding counter value.

Figure 11:
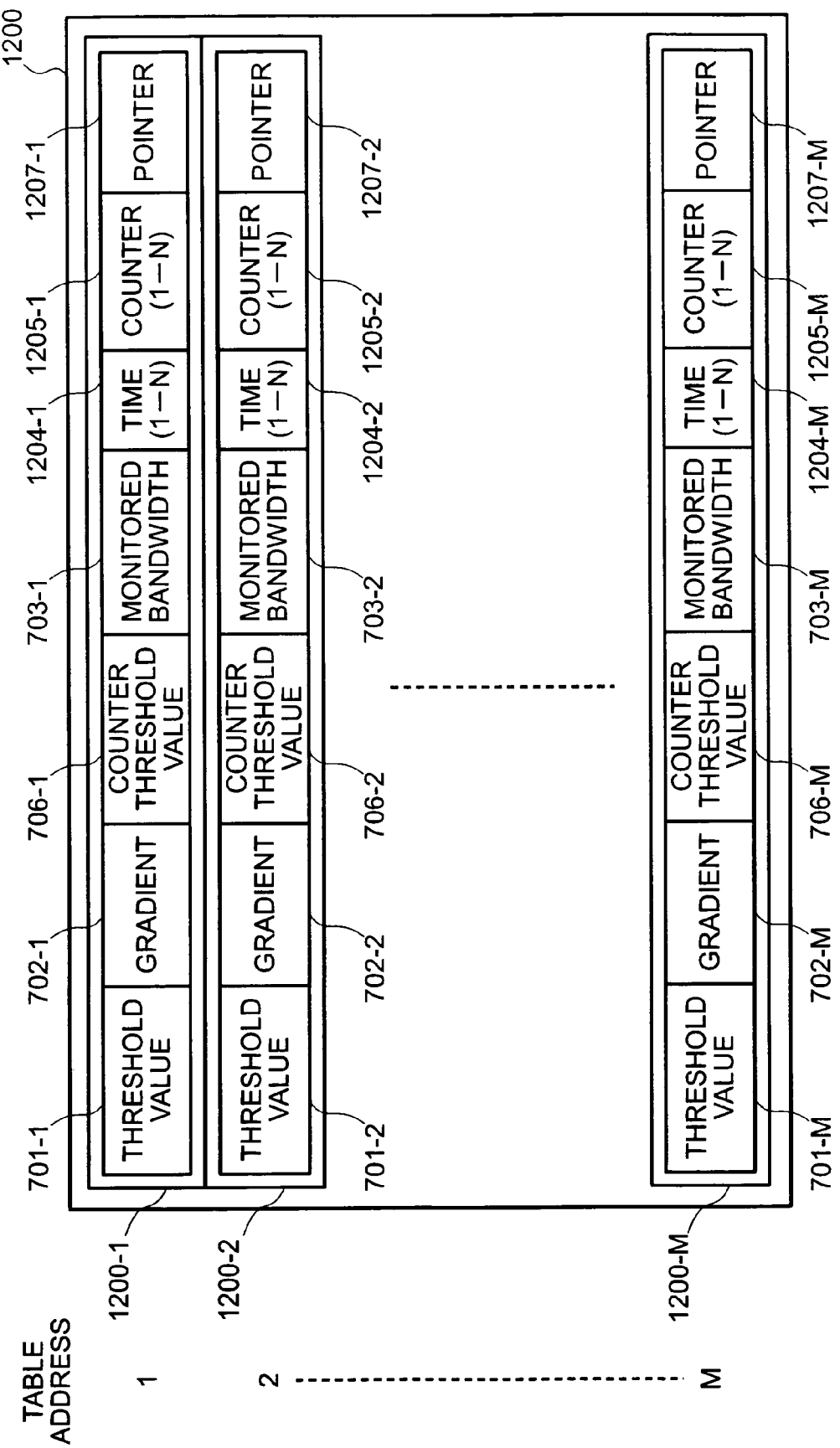
FIG. 11 is a diagram showing the format of a bandwidth monitoring table 1200 according to an embodiment of the present invention.

First, FIG. 11 shows the format of the bandwidth monitoring table 1200 in the bandwidth monitoring portion 1300. Bandwidth monitoring table 1200 is stored, for example, in a not-shown storage portion comprising the bandwidth monitoring portion 1300.

The bandwidth monitoring table 1200 constitutes M items of bandwidth monitoring control information 1200-$k$ (k=1 through M). The bandwidth monitoring portion 1300 executes bandwidth monitoring for one user in accordance with one item of bandwidth monitoring control information 1200-$k$ corresponding to a flow identifier 12. This bandwidth monitoring control information 1200-$k$ comprises a threshold value 701-$k$ (Byte), which is a threshold value for determining a violation in accordance with a probability of change corresponding to a packet length counter value; a gradient 702-$k$ for deciding a probability for determining compliance or a violation; a counter threshold value 706-$k$ (Byte); a monitored bandwidth 703-$k$ (Byte/sec) for indicating the monitoring rate; a time 1204($i$)-$k$ (sec) (i=1 through N), which is the time when it was determined that a packet, which references the same bandwidth monitoring control information 1200-$k$ (k=1 through M), is in compliance with a monitored bandwidth of i-times in the past (i=1 through N); a counter 1205($i$)-$k$ (Byte) (i=1 through N), which is the counter residual quantity of each time 1204($i$)-$k$; and a pointer 1207-$k$. The counter 1205($i$)-$k$ (Byte) and time 1204($i$)-$k$ (sec) (i=1 through N) cycle, and hold values from the most recent value to a value of N-times in the past, and the pointer 1207-$k$ indicates the positions which are being held by the most recent (immediately prior) counter 1205($i$)-$k$ (Byte) and time 1204($i$)-$k$ (sec) (i=1 through N). Based on the value of the pointer 1207-$k$, the immediately prior time 1204($i$)-$k$ (sec) and counter 1205($i$)-$k$ (Byte), and the oldest time 1204($i$+1)-$k$ (sec) and counter 1205($i$+1)-(Byte) are read out f results determining portion 1320 and the counter residual quantity determining portion 510. Of the information comprising the bandwidth monitoring control information 1200-$k$, information other than time 1204($i$)-$k$ (sec) and counter 1205($i$)-$k$ (Byte) is set by the management terminal 195.

Figure 12:
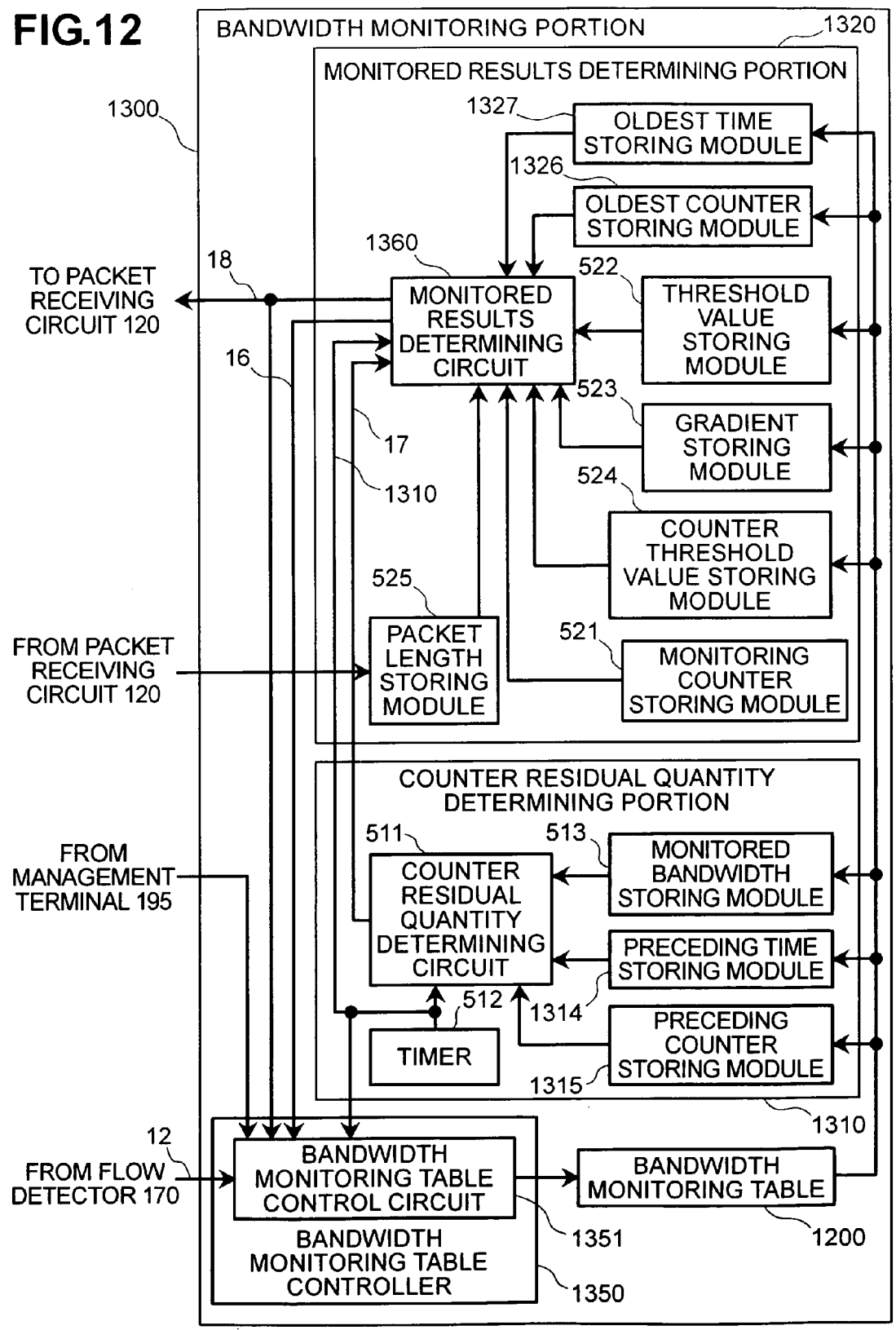
FIG. 12 is a block diagram showing the constitution of a bandwidth monitoring portion 1300 according to another embodiment of the present invention.
Figure 16:
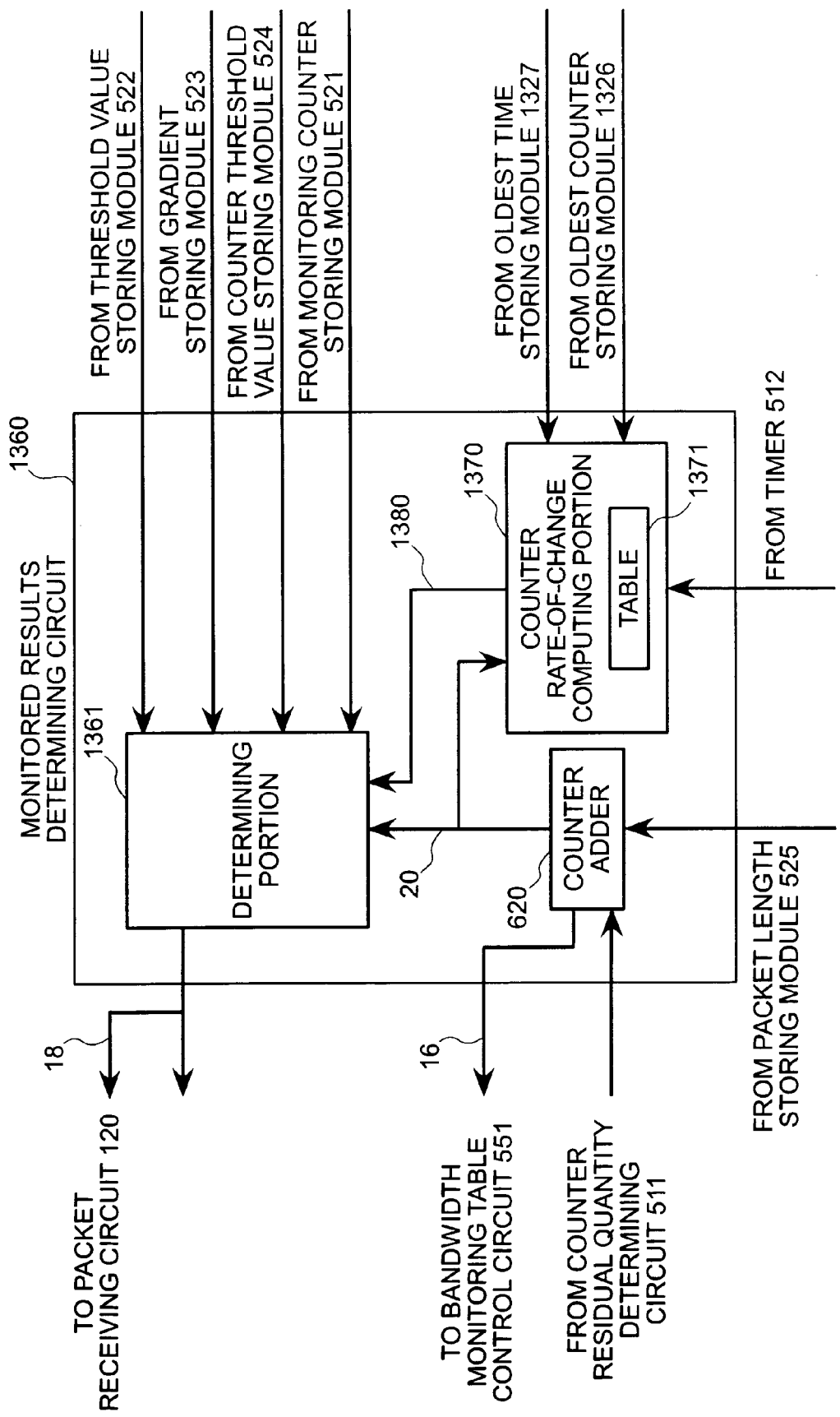
FIG. 16 is a block diagram of a monitoring results determining circuit 1360 in the bandwidth monitoring portion 1300.
Figure 17:
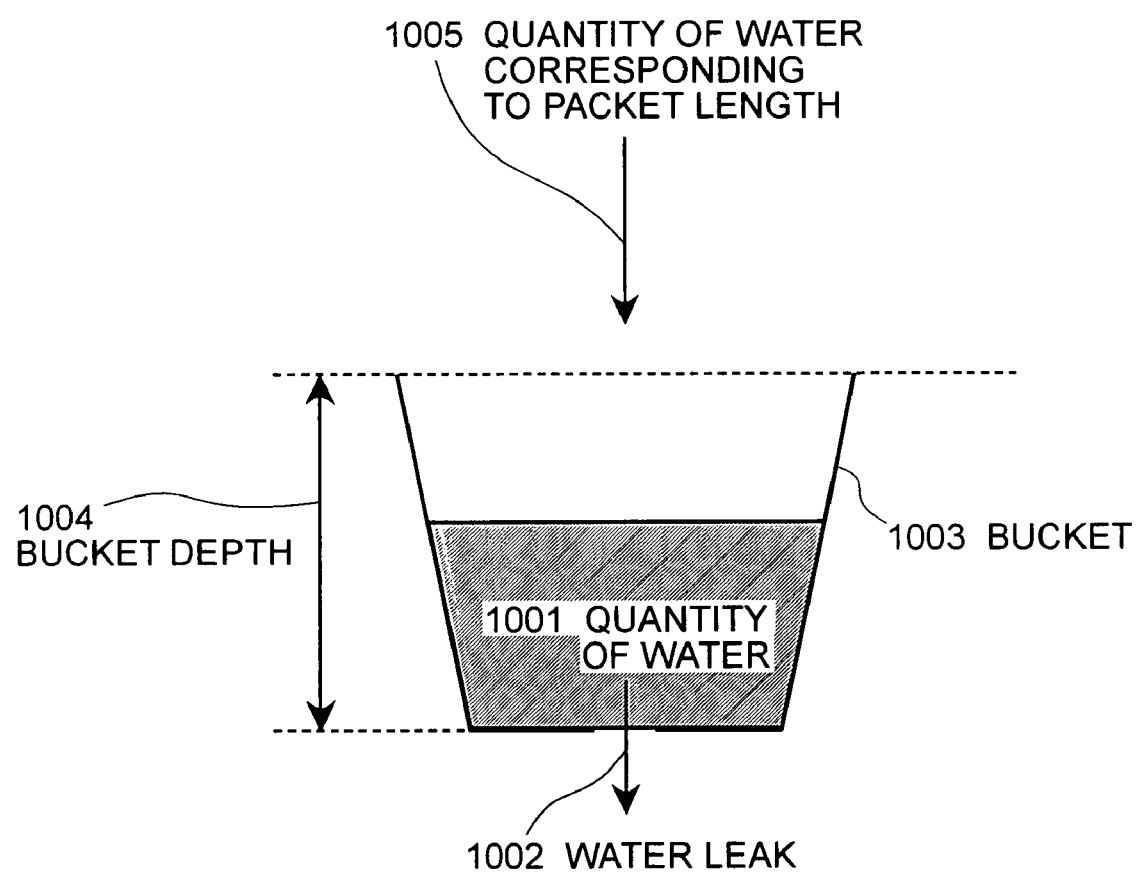
FIG. 17 is a model diagram representing a bandwidth monitoring algorithm.

FIG. 12 shows a block diagram of the bandwidth monitoring portion 1300. The bandwidth monitoring portion 1300 comprises the same constitution as the constitution comprising the above-described bandwidth monitoring portion 500, and also comprises an oldest time storing module 1327 and an oldest counter storing module 1326 inside the monitoring results determining portion 1320. Further, bandwidth monitoring portion 1300 also comprises a preceding time storing module 1314 (equivalent to time storing module 514 in bandwidth monitoring portion 500) and a preceding counter storing module 1315 (equivalent to counter storing module 515 in bandwidth monitoring portion 500) inside the counter residual quantity determining portion 1310. As will be described hereinbelow, a monitoring results determining circuit 1360 comprises the same constitution as the above-described monitoring results determining circuit 600, and also comprises a counter rate-of-change calculating portion 1370 (FIG. 16). A determining portion 1361 inside the monitoring results determining circuit 1360 receives signals from the oldest time storing module 1327, oldest counter storing module 1326, and timer 512, respectively, in addition to an added value 20 from counter adding portion 620. Based on these newest and oldest time data and counter data, the monitoring results determining circuit 1360 calculates the rate-of-change counter 1205($i$)-$k$ (Byte) and changes the gradient 702-$k$.

Figure 13:
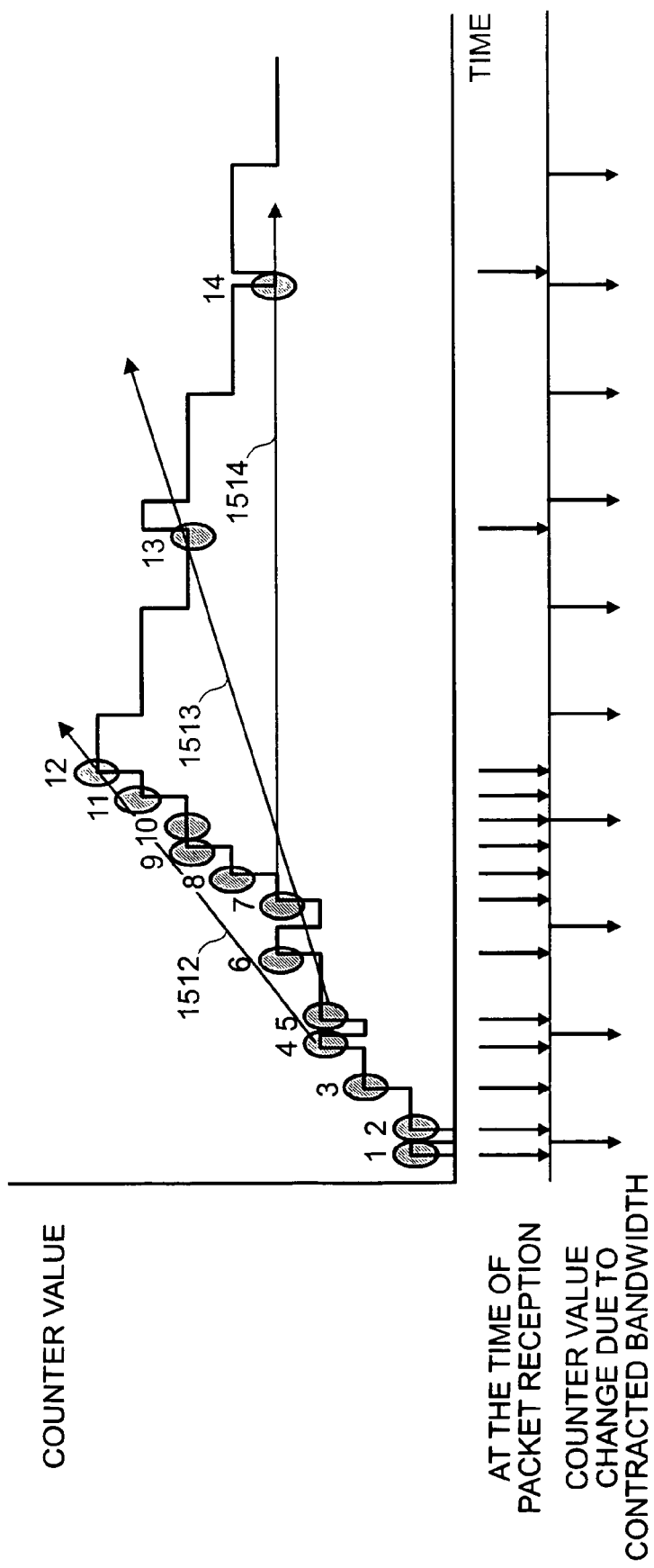
FIG. 13 is a graph representing an algorithm for calculating the rate of change of packet length counter values according to another embodiment of the present invention.

The algorithm for calculating the rate of change of a packet length counter value will be explained hereinbelow using FIG. 13. In the graph shown in FIG. 13, the vertical axis is counter values at packet reception (held in bandwidth monitoring table 1200 as counter 1205($i$)), and the horizontal axis is receiving times (held in bandwidth monitoring table 1200 as time values 1204($i$)-$k$), and the circumstances under which counter values changed when packets were received in the past are shown. A counter value rate of change is calculated from the oldest counter value (for example, in FIG. 13, counter value 4 with respect to counter value 12, and counter value 5 with respect to counter value 13) and the newest counter value determined by the counter residual quantity determining portion (in this example, counter value 12 and counter value 13) of the counter values shown in the graph. Furthermore, the oldest packet reception time and the counter value at that point in time (oldest counter value) are respectively held in the oldest time storing module 1327 and oldest counter storing module 1326. In FIG. 13, for example, the rate of change between counter value 4 and counter value 12 is represented by straight line 1512, the rate of change between counter value 5 and counter value 13 is represented by straight line 1513, and the rate of change between counter value 6 and counter value 14 is represented by straight line 1514. With regard to straight line 1514, because the oldest counter value 6 and the newest counter value 14 are the same, the rate of change is 100%. The rate of change represented by straight line 1513 is 120%, and the rate of change represented by straight line 1512 is 140%. Thus, the rate of change increases when the gradient increases. When the newest counter value is less than the oldest counter value, the rate of change decreases, for example, to 80% or 60%.

Figure 14:
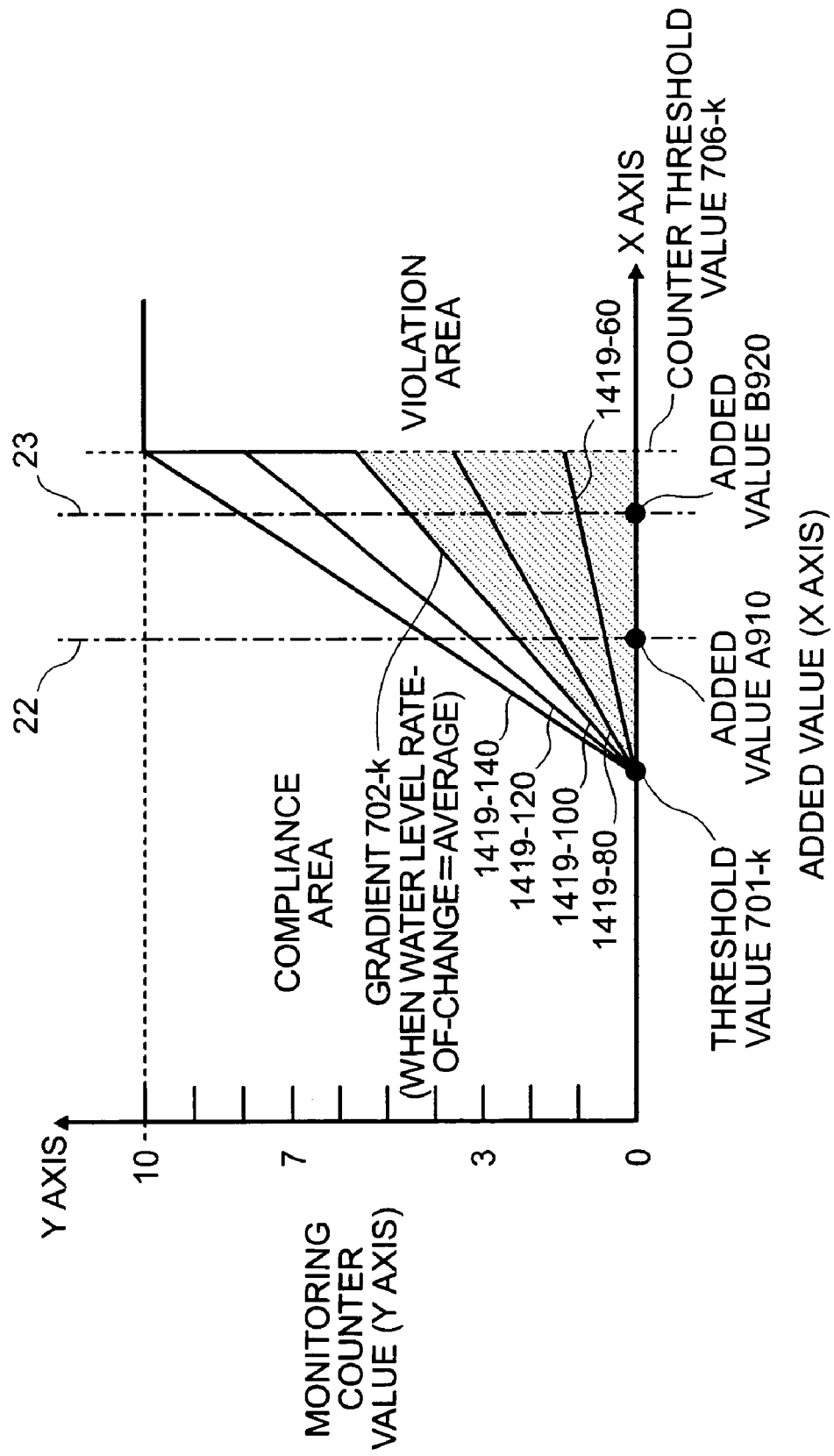
FIG. 14 is a graph representing an algorithm for changing the grade of a gradient 702-k according to another embodiment of the present invention.

Next, the algorithm for changing the grade of the gradient 702-$k$ based on the rate of change of calculated packet length counter values will be explained using FIG. 14. In the graph shown in FIG. 14, straight line 1419-100 corresponds to straight line 19 in FIG. 10. This straight line 1419-100 represents the gradient 702-$k$ applied when the calculated rate of change is 100%. When the rate of change is 120%, the gradient 702-*k* represented by straight line 1419-120 is applied, and when the rate of change is 140%, the gradient 702-*k* represented by the straight line 1419-140 is applied. Thus, the grade (inclination) of the gradient 702-*k* becomes larger as the rate of change becomes larger. Conversely, when the rate of change is 80%, the gradient 702-*k* represented by the straight line 1419-80 is applied, and when the rate of change is 60%, the gradient 702-*k* represented by the straight line 1419-60 is applied. Thus, the grade (inclination) of the gradient 702-*k* becomes smaller as the rate of change becomes smaller.

Figure 15:
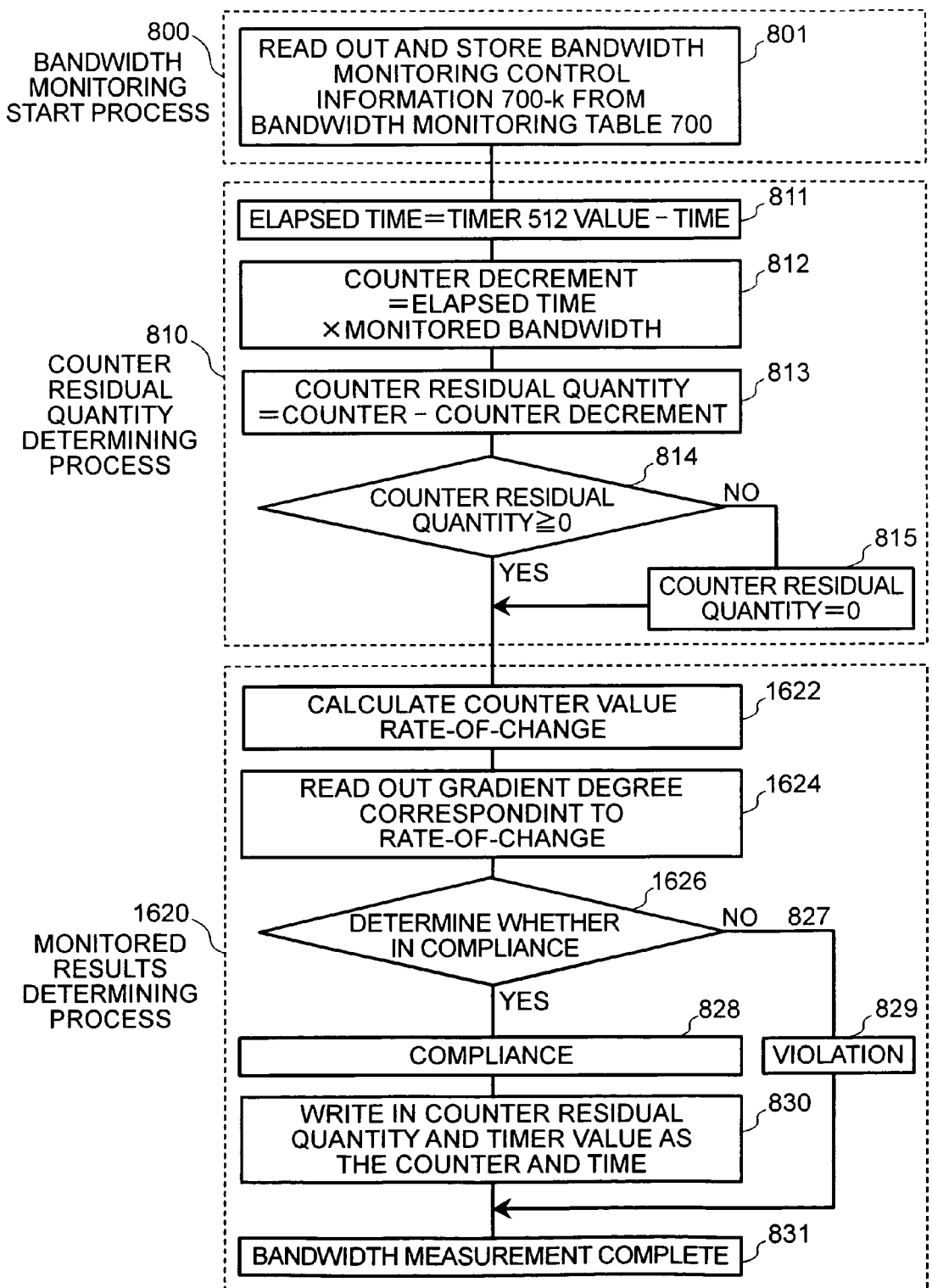
FIG. 15 is a flowchart of the processes executed by the bandwidth monitoring portion 1300 according to another embodiment of the present invention.

FIG. 15 shows a flowchart of the processes executed by the bandwidth monitoring portion 1300. The processes of the bandwidth monitoring portion 1300 comprise the same bandwidth monitoring start process 800 and counter residual quantity determining process 810 as the processes of bandwidth monitoring portion 500 indicated by the flowchart of FIG. 8, and also comprise a monitoring results determining process 1620, the contents of which differ from those of the monitoring results determining process 820 by bandwidth monitoring portion 500. The counter residual quantity determining process 810 is executed primarily by counter residual quantity determining portion 1310, and the monitoring results determining process 1620 is executed primarily by monitoring results determining portion 1320. The contents of the bandwidth monitoring start process 800 and the counter residual quantity determining process 810 are the same as the contents described hereinabove using FIG. 8. 100751 In the monitoring results determining process 1620, the monitoring results determining circuit 1360 of the monitoring results determining portion 1320 determines whether an inputted packet is in compliance with or violation of the monitored bandwidth. The monitoring results determining process will be explained in detail hereinbelow using FIG. 15 and FIG. 16.

FIG. 16 shows a block diagram of the monitoring results determining circuit 1360. The monitoring results determining circuit 1360 comprises the same constitution as the monitoring results determining circuit 600 shown in FIG. 9, but also comprises a new counter rate-of-change calculating portion 1370. The counter rate-of-change calculating portion 1370 has a table 1371 for holding the grade (inclination) of a gradient 702-*k* corresponding to the rate of change of packet length counter values. Table 1371 is stored in a not-shown storage device comprised in either monitoring results determining circuit 1360 or monitoring results determining portion 1320.

Counter adding portion 620 adds together counter residual quantity information 17 determined by the counter residual quantity determining circuit 511, and packet length information (Byte) received from the packet length storing module, and sends the added value 20 to determining portion 1361, bandwidth monitoring table control circuit 551 and counter rate-of-change calculating portion 1370. The counter rate-of-change calculating portion 1370 receives the oldest counter value sent from the oldest counter storing module 1326, the oldest packet reception time sent from the oldest time storing module 1327, the added value 20 sent from the counter adding portion 620, and the value of the current time sent from timer 512, respectively. As explained using FIG. 13, the counter rate-of-change calculating portion 1370 calculates the rate of change of the counter 705(*i*)-*k* (Byte) using these received values (Step 1622 in FIG. 15).

Next, the counter rate-of-change calculating portion 1370 reads out from table 1371 the grade of the gradient 702-*k* corresponding to the rate of change determined in Step 1622, and sends it to the determining portion 1361 (Step 1624 in FIG. 15).

The same as the determining portion 610 of the above-mentioned monitoring results determining portion 600, the determining portion 1361 receives an added value 20, monitoring counter value, threshold value 701-*k*, gradient 702-*k*, and counter threshold value 706-*k*. In addition, the determining portion 1361 also receives the grade of the gradient 702*k* from the counter rate-of-change calculating portion 1370.

The determining portion 1361 changes the gradient 702-*k* from the determining algorithm shown in FIG. 10 in accordance with the grade of gradient 702-*k* received from the counter rate-of-change calculating portion 1370. Then, the determining portion 1361 determines whether an inputted packet is in "compliance" or in "violation" based on the added value 20, monitoring counter value, threshold value 701-*k*, counter threshold value 706-*k*, and changed gradient 702-*k* (Step 1626 in FIG. 15).

Processing subsequent to Step 1626 in FIG. 15 (Step 827 through Step 831) is the same as the content explained using FIG. 8 and FIG. 9.

Thus, the bandwidth monitoring portion 1300 in this example not only determines that a received packet is in violation in accordance with a drop probability proportional to an added value 20, but also determines a violation by changing, in accordance with the rate of change of counter values, the gradient 702-*k*, which decides this drop probability. Accordingly, if the counter value increases (the rate of change becomes larger), violation determinations are carried out in accordance with a larger drop probability, and the frequency at which packets are dropped rises, and if the counter value decreases (the rate of change becomes smaller), violation determinations are carried out in accordance with a smaller drop probability, and the frequency at which packets are dropped declines. As a result of this, the bandwidth monitoring portion 1300 can adjust the frequency at which packets are dropped in accordance with the rate of change of the counter values.

According to the present embodiment, bursty dropping can be avoided, and packets can be dropped probabilistically even when TCP packets flow into a network in a bursty manner. By dropping packets probabilistically like this, bandwidth deterioration resulting from restarting TCP flow control from the slow start phase can be avoided, and it becomes possible for users to utilize contracted bandwidth more effectively.

Furthermore, according to the present embodiment, because the drop probability is changed in accordance with the rate of change of counter values, for example, when the rate of change is decremental (less than 100%), the drop probability can be lowered, and unnecessary packet dropping can be avoided, and when the rate of change is incremental (more than 100%), congestion can be held in check at an early stage by raising the drop probability.

The exemplary embodiments of the present invention have been described above. These embodiments were, however, presented merely for facilitating the understanding of the present invention, and should not be construed as placing limitations on the present invention. The present invention can be changed or modified without departing from the essence thereof, and the present invention also includes the equivalents thereof.

What is claimed is:

1. A bandwidth monitoring device for monitoring a packet bandwidth, comprising:
   a counter residual quantity value determining portion which determines a current counter residual quantity value which represents a residual value of a packet length counter value by adding up inputted packet lengths and subtracting outputted packet lengths immediately prior to input of a next input packet; and a monitoring results determining portion which sets determination criteria, and determines in accordance with the determination criteria whether input packets violate or comply with a monitored bandwidth;

wherein the determination criteria include a determination criterion, based on the counter residual quantity value from said counter residual quantity value determining portion, that all input packets are in compliance with the monitored bandwidth when the counter residual quantity value is equal to or less than a first threshold value;

wherein the determination criteria include a determination criterion such that a drop probability, by which a determination is made that input packets violate the monitored bandwidth when the counter residual quantity value exceeds the first threshold value, becomes greater pursuant to increases in the counter residual quantity value; and wherein the determination criteria include a determination criterion that all input packets violate the monitored bandwidth when the counter residual quantity value exceeds a second threshold value which is greater than the first threshold value, wherein the counter residual quantity value determining portion determines the current counter residual quantity value by computing an elapsed time which has passed since a packet having an identical flow identifier as the inputted packet was in compliance with the monitored bandwidth, multiplying the elapsed time by the monitored bandwidth, computing a counter decrement from when the preceding packet having the identical flow identifier was determined to be in compliance with the monitored bandwidth until immediately prior to the packet being inputted, and subtracting the counter decrement from the packet length counter value to obtain the counter residual quantity value immediately prior to the packet being inputted.

2. A bandwidth monitoring device for monitoring a packet bandwidth, comprising:

a counter residual quantity value determining portion which determines a current counter residual quantity value which represents a residual value of a packet length counter value by adding up inputted packet lengths and subtracting outputted packet lengths immediately prior to input of a next input packet; and a monitoring results determining portion which sets determination criteria, and determines in accordance with the determination criteria whether input packets violate or comply with a monitored bandwidth;

wherein the determination criteria include a determination criterion, based on the counter residual quantity value from said counter residual quantity value determining portion, that all input packets are in compliance with the monitored bandwidth when the counter residual quantity value is equal to or less than a first threshold value;

wherein the determination criteria include a determination criterion such that a drop probability, by which a determination is made that input packets violate the monitored bandwidth when the counter residual quantity value exceeds the first threshold value, becomes greater pursuant to increases in the counter residual quantity value; and wherein the determination criteria include a determination criterion that all input packets violate the monitored bandwidth when the counter residual quantity value exceeds a second threshold value which is greater than the first threshold value, wherein said monitoring results determining portion determines a rate of change of a counter residual quantity value from a preceding counter residual quantity value and a preceding time corresponding to the preceding counter residual quantity value, and the current counter residual quantity value determined by said counter residual quantity value determining portion, and a current time corresponding to the current counter residual quantity value, to determine a change rate of the drop probability relative to the counter residual quantity value in accordance with the determined rate of change of the counter residual quantity value, and to determine, based on the current counter residual quantity value and a random number value, whether or not input packets will be dropped in accordance with said determination criteria by virtue of an updated drop probability which is updated according to the change rate of the drop probability.

3. The bandwidth monitoring device according to claim 2, further comprising a bandwidth monitoring table which stores bandwidth monitoring control information with respect to each flow of input packets; and wherein said bandwidth monitoring control information comprises a threshold value, which is the threshold value for determining a violation by a probability for change corresponding to the packet length counter value; a gradient for deciding a probability for making a determination as to compliance or violation; a monitored bandwidth rate for expressing a monitoring rate; a plurality of times, which are times for determining that packets, which reference the same bandwidth monitoring control information, were in compliance with a previously monitored bandwidth; and a plurality of counter residual quantity values for each of the plurality of times.

4. The bandwidth monitoring device according to claim 3, wherein the immediately preceding time immediately prior to the packet being inputted and the counter residual quantity value of the preceding time, and an oldest time at which a packet was received and the counter residual quantity value of the oldest time are read out from said bandwidth monitoring table, and are sent, respectively, to said counter residual quantity value determining portion and said monitoring results determining portion.

5. The bandwidth monitoring device according to claim 2, wherein said monitoring results determining portion comprises:

an oldest time storing module which stores an oldest time at which a packet was received;

an oldest counter storing module which stores the counter residual quantity value of the oldest time;

a threshold value storing module which outputs a first threshold value, which is a staffing position for a probabilistic bandwidth violation determination;

a gradient storing module which outputs a gradient for deciding a probability to be used for carrying out a bandwidth violation determination; and a monitoring counter storing module which outputs random counter values;

wherein said monitoring results determining portion is sets said determination criteria based on output values of said storing modules.

6. The bandwidth monitoring device according to claim 2, further comprising a plurality of input lines and a plurality of output lines; wherein an input packet inputted from one of the input lines of said plurality of input lines is outputted to any of the output lines of said plurality of output lines; and wherein said determination criteria are set for each of said plurality of input lines, and the bandwidth for input packets is monitored using the determination criteria.

7. The bandwidth monitoring device according to claim 6, wherein said determination criteria are set for each flow of input packets, which is the flow of a series of packets determined from at least one of the information inside a packet header of said input packet and the input line information, and wherein the bandwidth for input packets is monitored using said determination criteria.

8. The bandwidth monitoring device according to claim 2, further comprising a packet receiving circuit which rewrites a transmission priority of a packet that violates the monitored bandwidth to a lower priority.

9. The bandwidth monitoring device according to claim 2, further comprising a packet receiving circuit which drops a packet that violates the monitored bandwidth.

10. A bandwidth monitoring device for monitoring a bandwidth of either fixed-length or variable-length packets, the bandwidth monitoring device comprising:
    a counter residual quantity value determining portion which determines a current counter residual quantity value which represents a residual value of a packet length counter value by adding up inputted packet lengths and subtracting outputted packet lengths immediately prior to input of a next input packet; and
    a monitoring results determining portion which sets determination criteria, and to determine in accordance with the determination criteria whether input packets violate or comply with a monitored bandwidth;
    wherein the determination criteria include a determination criterion, based on an added value representing a sum of the counter residual quantity value from said counter residual quantity value determining portion and a packet length of the next input packet, that all input packets are in compliance with the monitored bandwidth when the added value is equal to or less than a first threshold value; and
    wherein the determination criteria include a determination criterion such that a drop probability, by which a determination is made that input packets violate the monitored bandwidth when the added value exceeds the first threshold value, becomes greater pursuant to increases in the added value,
    wherein said monitoring results determining portion determines a rate of change of a counter residual quantity value from a past counter residual quantity value and a past time corresponding to the past counter residual quantity value, and a current counter residual quantity value determined by said counter residual quantity determining portion and a current time corresponding to the current counter residual quantity value, to determine a change rate of a drop probability relative to the counter residual quantity value in accordance with the determined rate of change, and to determine, with respect to the current counter residual quantity value, whether input packets violate or comply with the monitored bandwidth in accordance with said determination criteria by virtue of an updated drop probability which is updated according to the change rate of the drop probability.

11. The bandwidth monitoring device according to claim 10, wherein the determination criteria set by said monitoring results determining portion include a determination criterion that all input packets violate the monitored bandwidth when said added value exceeds a second threshold value that is larger than the first threshold value.

12. The bandwidth monitoring device according to claim 10, further comprising a bandwidth monitoring table which stores bandwidth monitoring control information for each flow of input packets; wherein said bandwidth monitoring control information comprises said first threshold value for carrying out either a violation or compliance determination; gradient information; monitored bandwidth information for expressing a monitoring rate; a plurality of times, which are times for determining that packets, which reference the same bandwidth monitoring control information, were in compliance with a previously monitored bandwidth; and a plurality of counter residual quantity values for each of the plurality of times.

13. A bandwidth monitoring device, comprising:
    a packet receiving circuit which receives packets;
    a counter which counts a total packet length by adding up inputted packet lengths including a packet length of a next input packet and subtracting outputted packet lengths to produce a counted value;
    a timer which times a packet receiving time;
    a memory which stores a number of packet receiving times and a number of counted values counted by said counter which correspond to the packet receiving times, respectively;
    a counter rate-of-change calculating portion which calculates a change rate by a first counted value corresponding to an oldest packet receiving time stored in said memory representing an oldest time at which a packet was received and a second counted value corresponding to a latest packet receiving time stored in said memory representing a latest time at which a packet was received; and
    a determining portion which decides whether the next input packet will be discarded based on a probability computed by said change rate and the counted value counted by said counter when said packet receiving circuit receives the next input packet.

14. The bandwidth monitoring device according to claim 13, wherein the determining portion sets determination criteria, and to determine in accordance with the determination criteria whether input packets violate a monitored bandwidth and will be discarded or comply with the monitored bandwidth;
    wherein the determination criteria include a determination criterion, based on the counted value counted by said counter, that all input packets are in compliance with the monitored bandwidth when the counted value is equal to or less than a first threshold value; and
    wherein the determination criteria include a determination criterion such that a drop probability, by which a determination is made that input packets violate the monitored bandwidth when the counted value exceeds the first threshold value, becomes greater pursuant to increases in the counted value.

15. The bandwidth monitoring device according to claim 14, wherein the determination criteria set by the determining portion include a determination criterion that all input packets violate the monitored bandwidth when the counted value exceeds a second threshold value which is greater than the first threshold value.

16. The bandwidth monitoring device according to claim 14, further comprising a bandwidth monitoring table which stores bandwidth monitoring control information for each flow of input packets; wherein the bandwidth monitoring control information comprises the first threshold value for carrying out either a violation or compliance determination; gradient information; monitored bandwidth information for expressing a monitoring rate; a plurality of times, which are times for determining that packets, which reference the same bandwidth monitoring control information, were in compliance with a monitored bandwidth in the past; and a plurality of counted values for each of the plurality of times.

* * * * *